(12) United States Patent
Shiokawa et al.

(10) Patent No.: US 6,350,094 B1
(45) Date of Patent: Feb. 26, 2002

(54) BOLT AND A NUT LOCKING MECHANISM

(75) Inventors: Takeji Shiokawa, Tsukui-gun;
Toshimitsu Nakagawa, Hadano;
Mitsukiyo Tani, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/455,376

(22) Filed: Dec. 6, 1999

(30) Foreign Application Priority Data

Dec. 4, 1998 (JP) .......................................... 10-345144

(51) Int. Cl.[7] .......................... F16B 39/32; F16B 39/282
(52) U.S. Cl. ........................ 411/114; 411/146; 411/157; 411/299; 411/953
(58) Field of Search ................................ 411/114, 115, 411/145, 146, 157, 299, 941, 941.1, 953

(56) References Cited

U.S. PATENT DOCUMENTS

| 1,041,831 A | * | 10/1912 | Martin ..................... 411/953 X |
| 1,269,386 A | * | 6/1918 | Carlson ................... 411/157 X |
| 1,316,344 A | * | 9/1919 | Wooden .................. 411/953 X |
| 2,141,701 A | * | 12/1938 | Wherkovich ........... 411/953 X |
| 2,544,304 A | | 3/1951 | Eckenbeck et al. |
| 3,370,631 A | | 2/1968 | James |
| 4,435,112 A | * | 3/1984 | Becker .................... 411/546 X |
| 5,209,621 A | * | 5/1993 | Burbidge ................ 411/546 X |

FOREIGN PATENT DOCUMENTS

| JP | 8-189522 | 7/1996 |
| JP | 9-32835 | 2/1997 |

* cited by examiner

*Primary Examiner*—Neill Wilson
(74) *Attorney, Agent, or Firm*—Mattingly, Stanger & Malur, P.C.

(57) ABSTRACT

A present invention provides a locking mechanism capable of preventing a bolt from loosening. A bolt 5 has a head provided with a first part which comprises openings 511. A locking washer 4 is provided with a second part which includes outer projections 411 and a third part which includes insertion projections 401 on an outer edge. A taper piece 1 has a portion provided with a fourth part which comprises openings 105. The first part and the second part can engage with each other and the third part and the fourth part can engage with each other when said bolt 5 fastens at least two members 7 and 8 trough said washer 4 and said taper piece 1. Accordingly, the bolt 5 is prevented from rotating in an loosening direction.

19 Claims, 20 Drawing Sheets

FIG. 5A
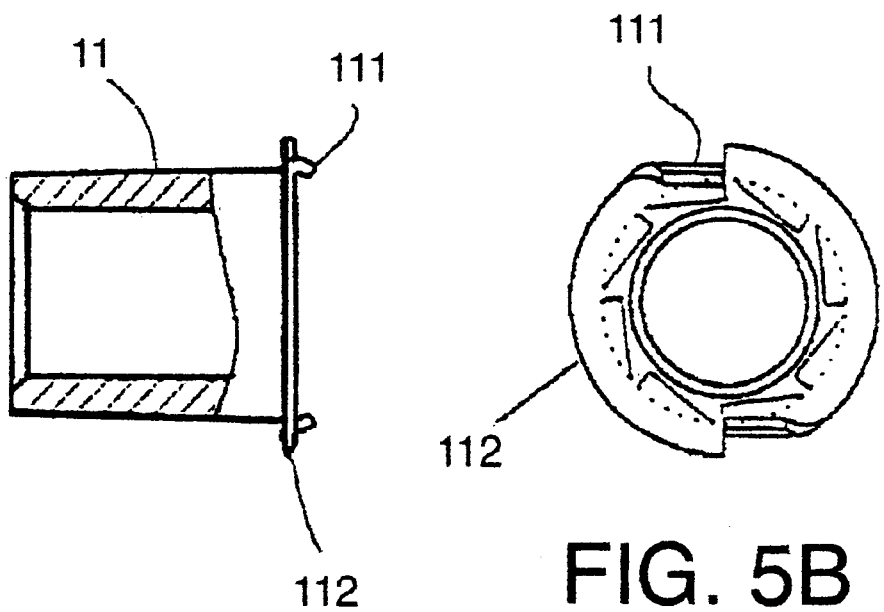
FIG. 5B
FIG. 5C
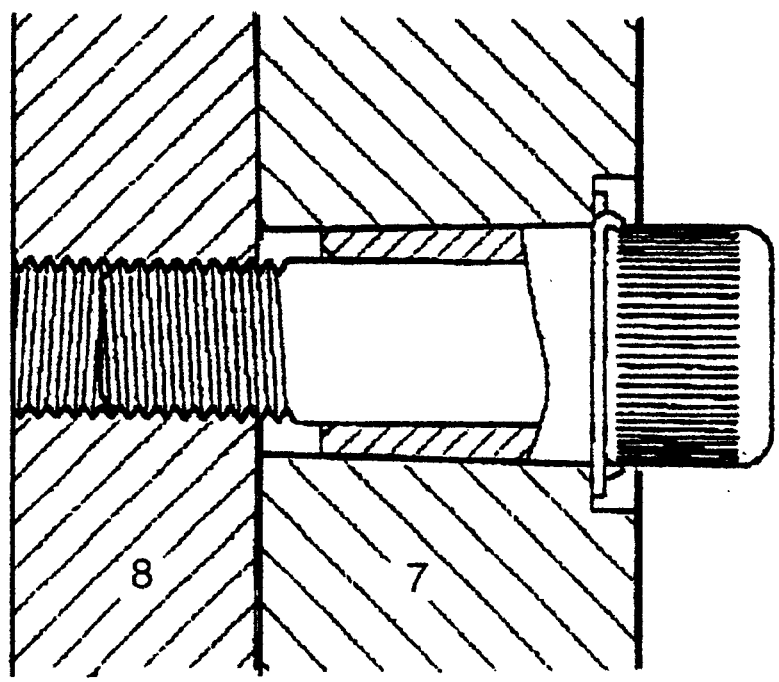

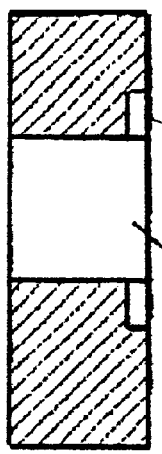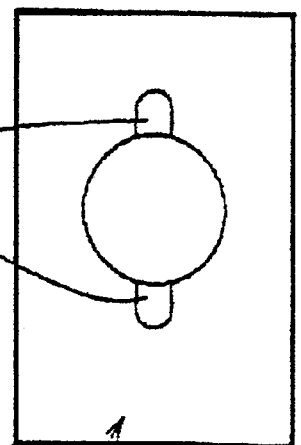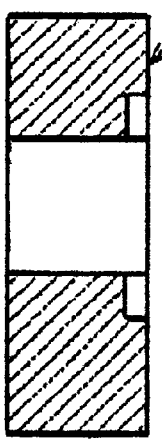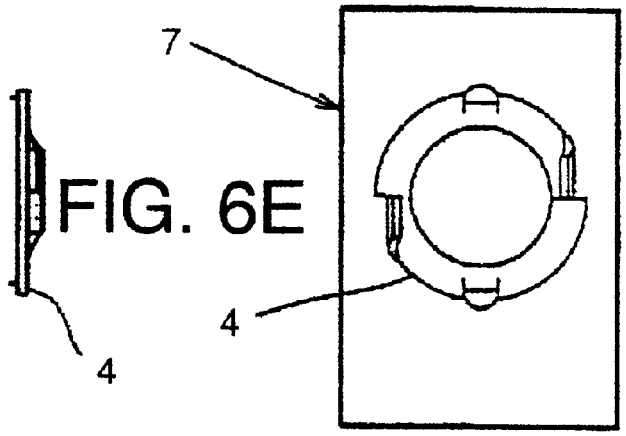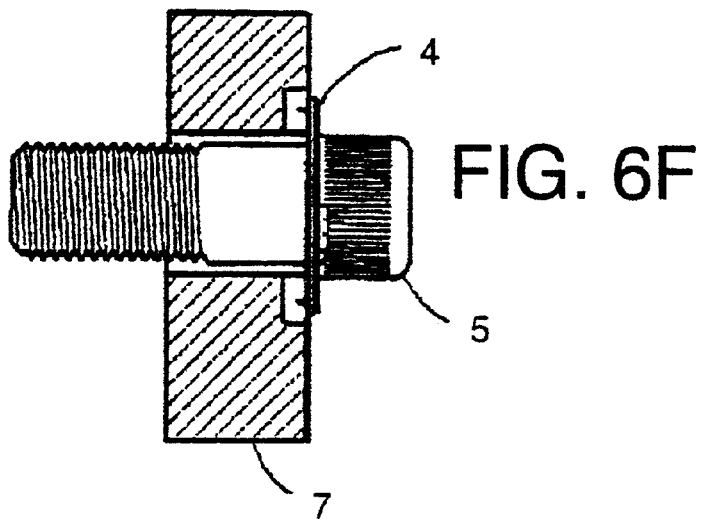

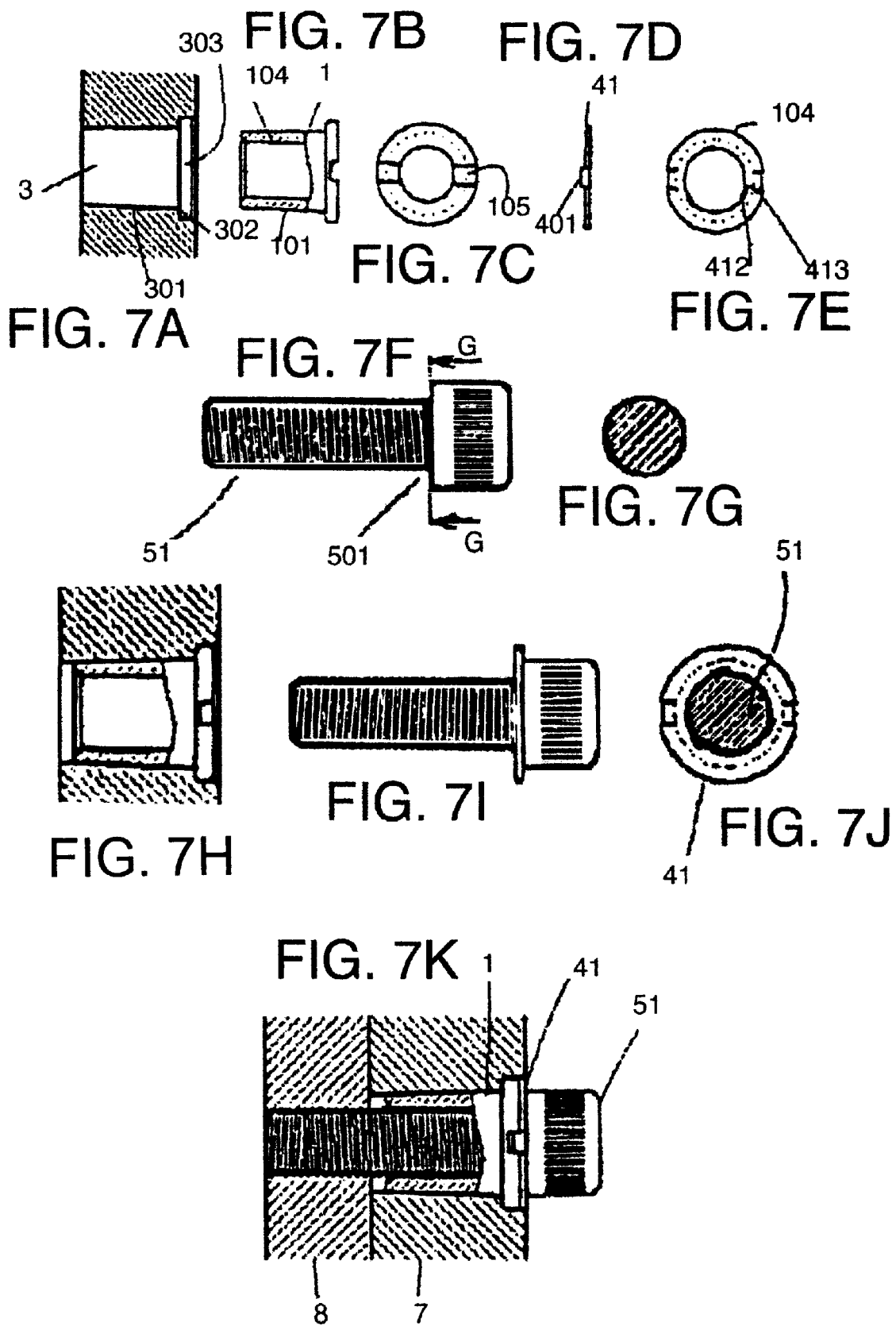

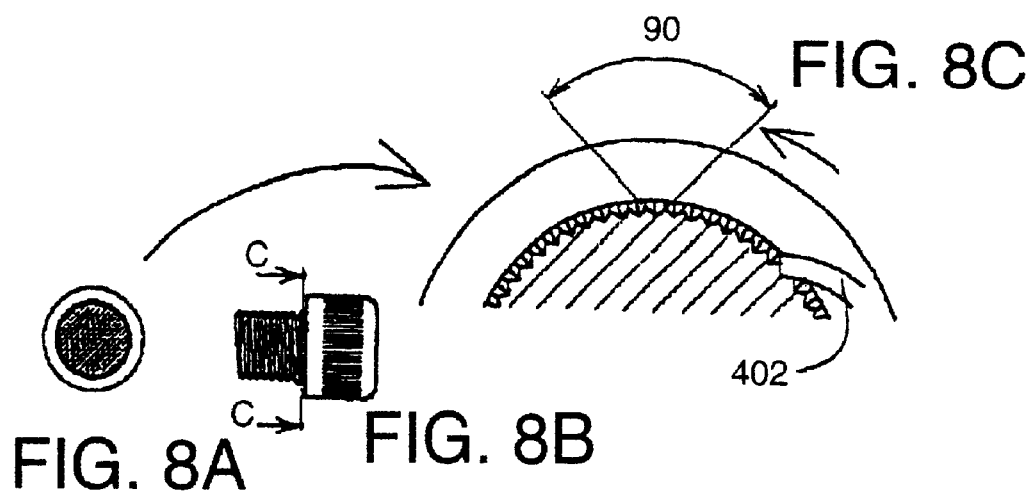
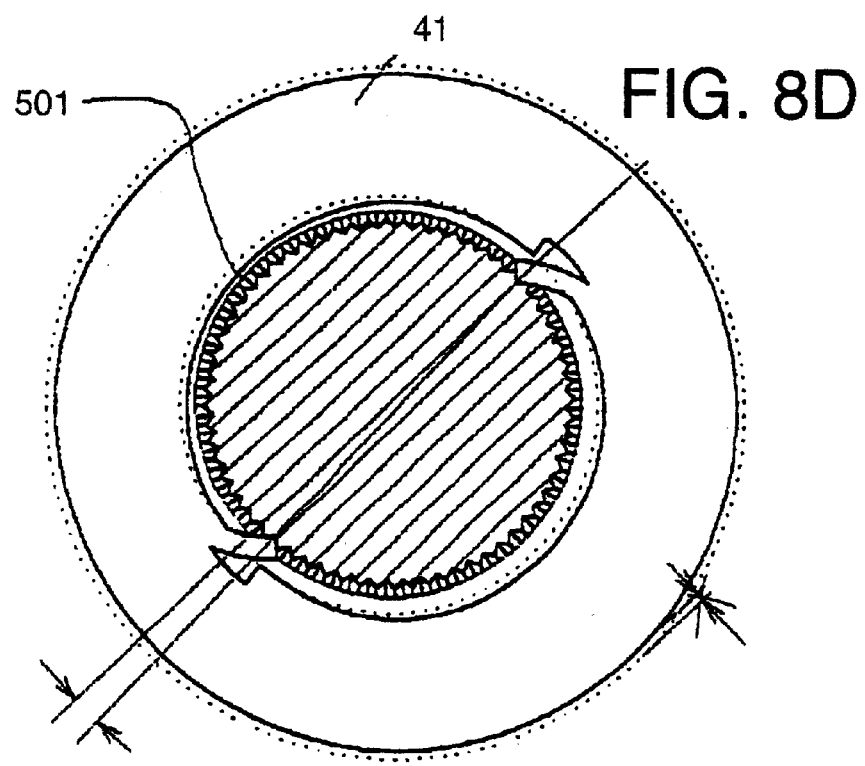

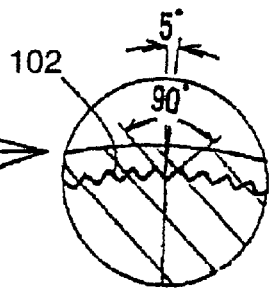
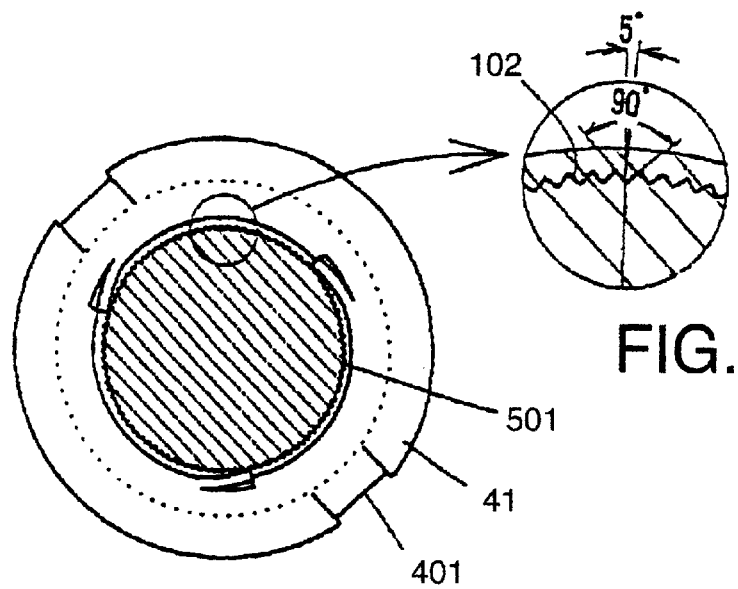
FIG. 9B
FIG. 9A
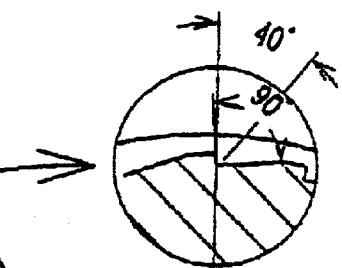
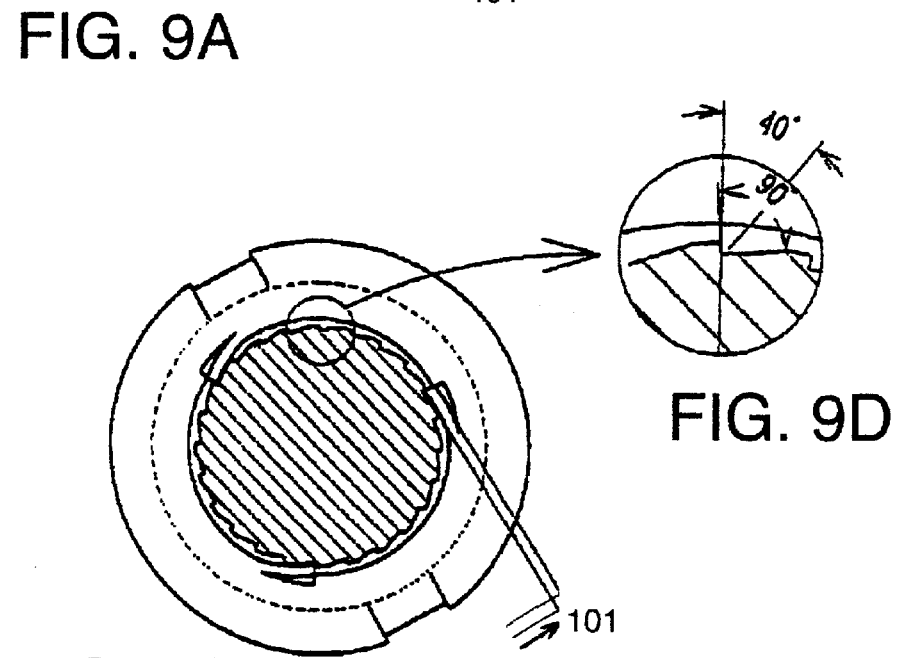
FIG. 9D
FIG. 9C
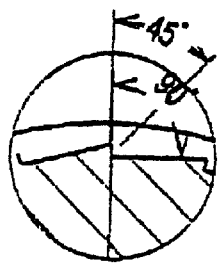
FIG. 9E

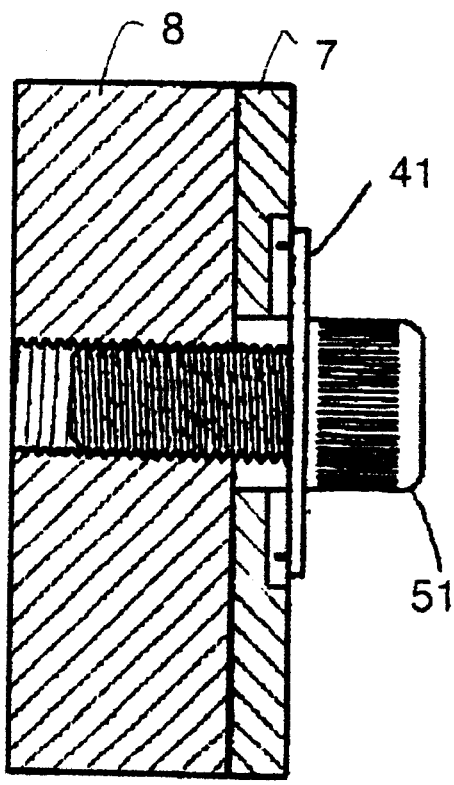
FIG. 11A
FIG. 11B
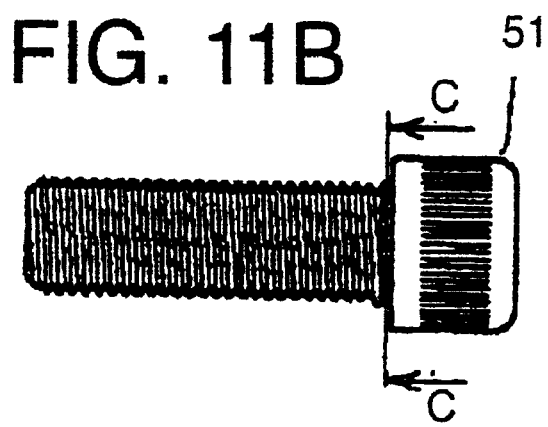
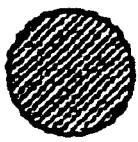
FIG. 11C

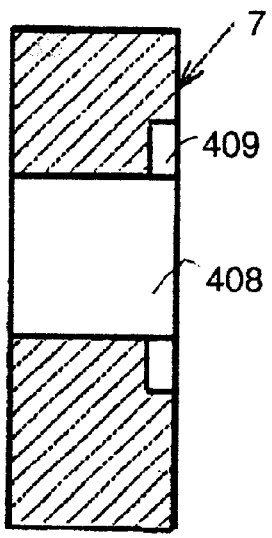
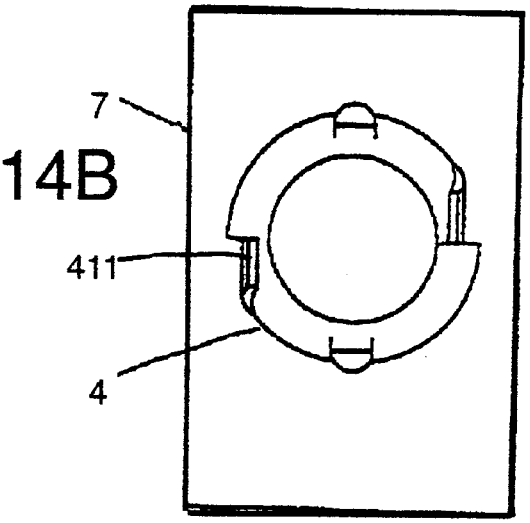
FIG. 14A
FIG. 14B
FIG. 14C
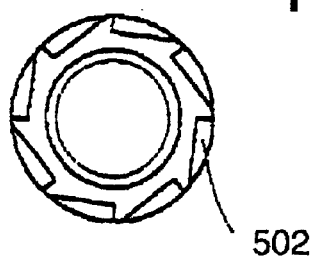
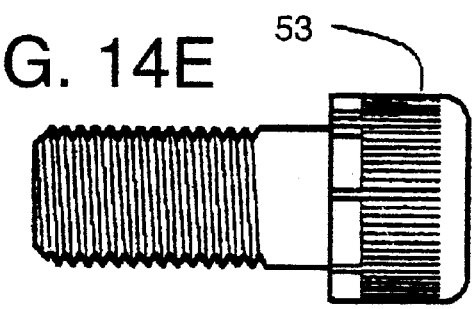
FIG. 14D
FIG. 14E

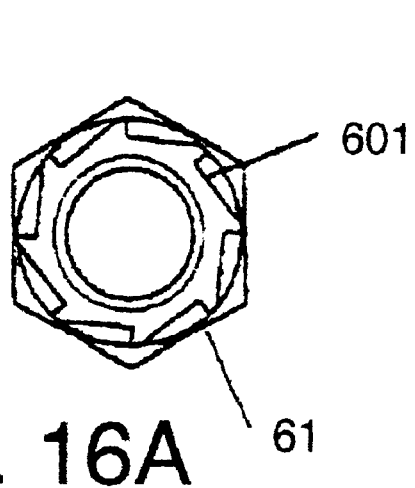
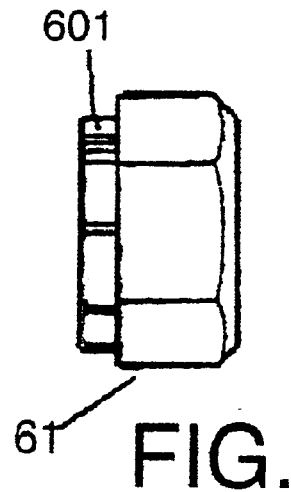
FIG. 16A   FIG. 16B
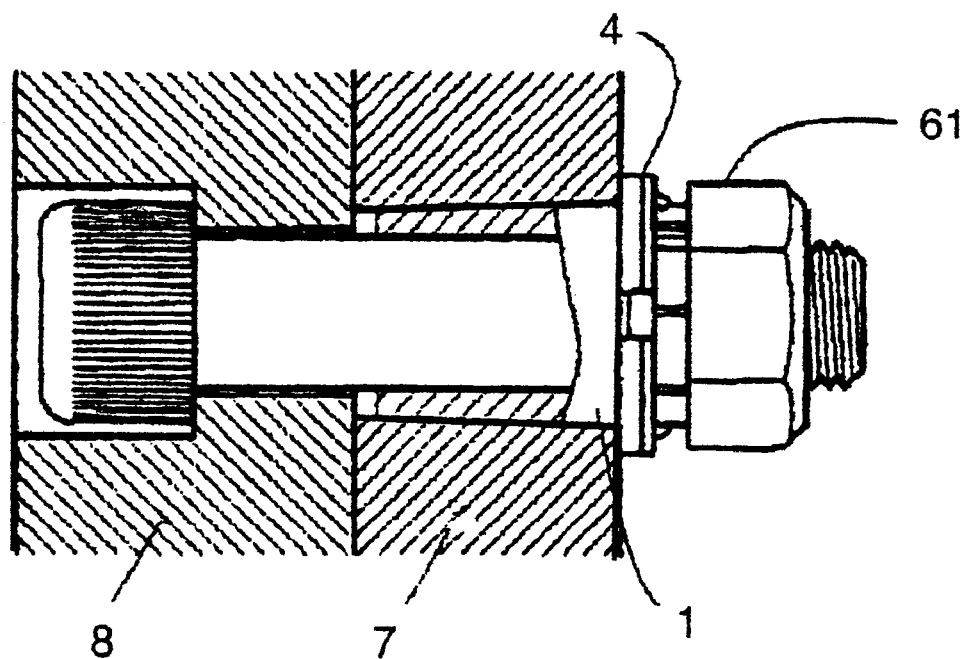
FIG. 16C

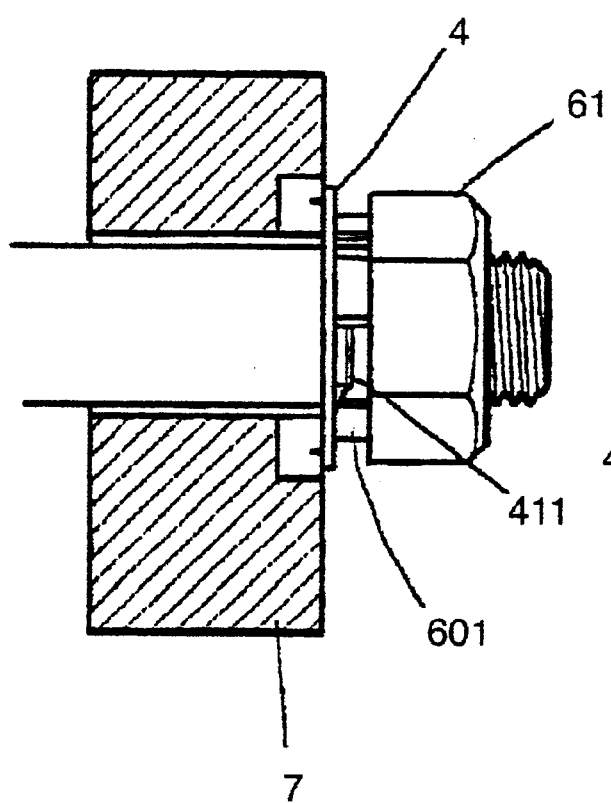
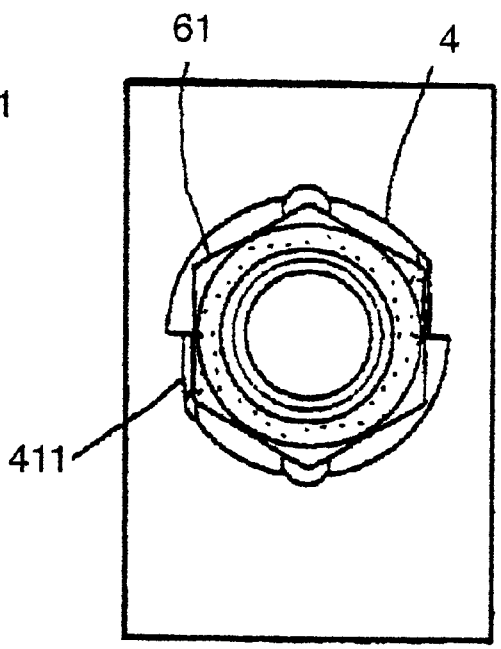
FIG. 17A
FIG. 17B

FIG. 19A
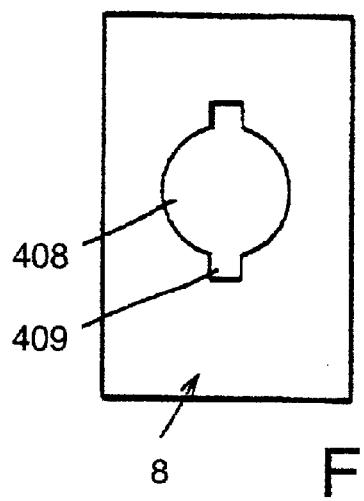
FIG. 19B
FIG. 19C
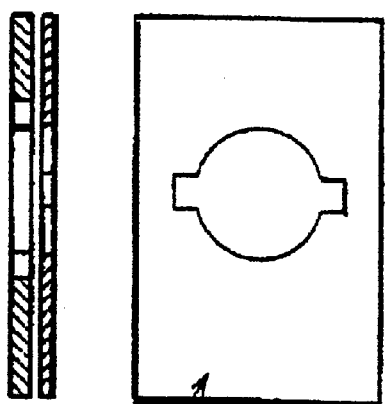
FIG. 19D
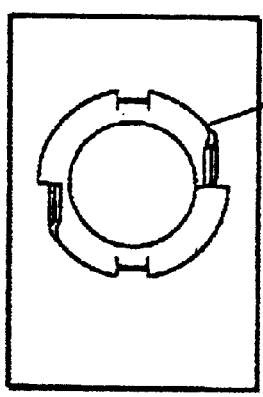
FIG. 19E
FIG. 19F
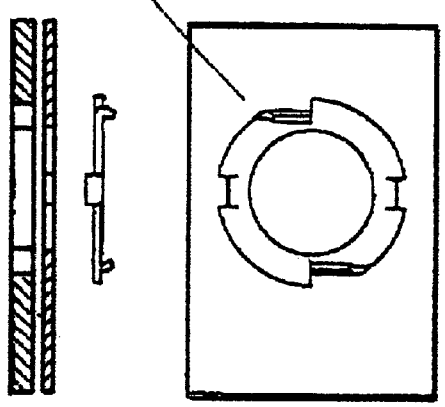
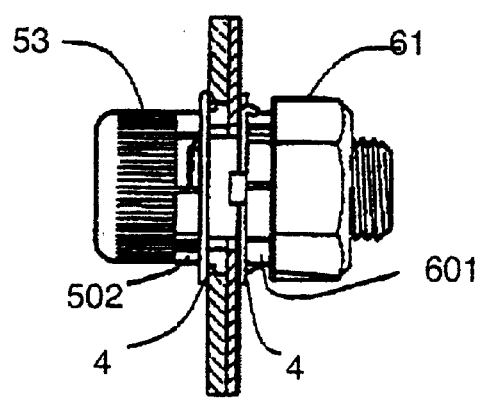
FIG. 19G FIG. 20A
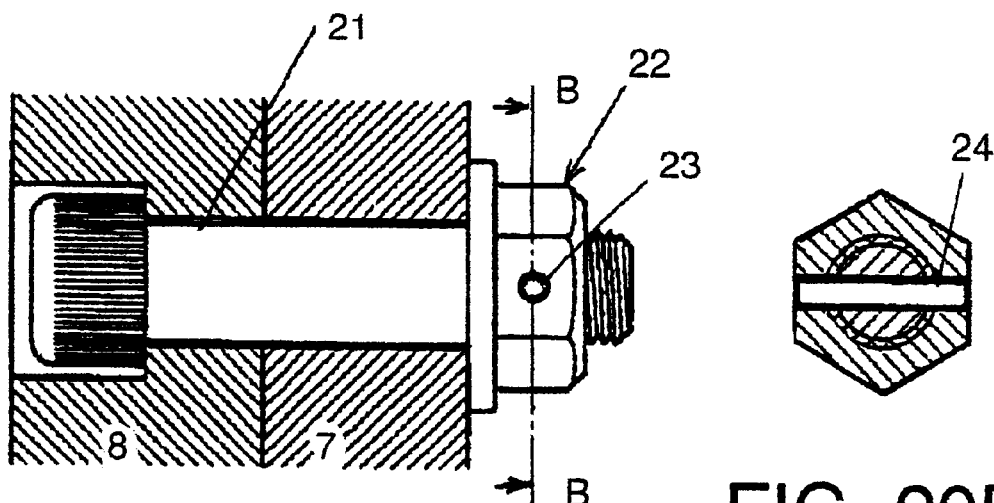
FIG. 20B
FIG. 20C
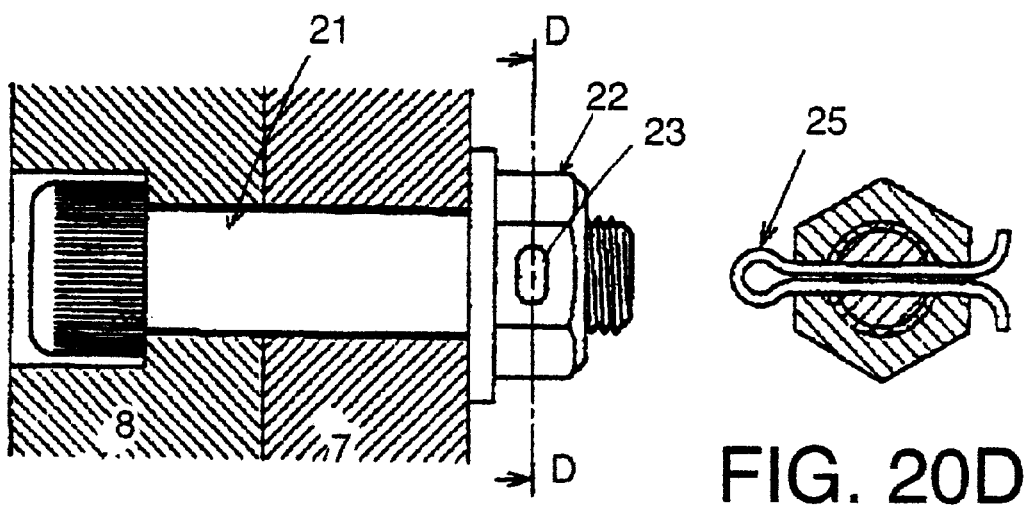
FIG. 20D

BOLT AND A NUT LOCKING MECHANISM

BACKGROUND OF THE INVENTION

The present invention relates to a mechanism suitable for locking a bolt or a nut.

Generally a bolt or a nut are locked by an elastic locking method using a spring washer or an adhesive locking method using an adhesive. The elastic locking method fastens members to be fastened together by twisting a bolt into a nut with a washer interposed between the bolt or the nut and the member. If the members are fastened together with the bolt and the nut without using any spring washer, there are presented some inconveniences that when the bolt and the nut suffer heat and vibrations so that the members are disfigured, or when the bolt and the nut become loose for forming a gap therebetween, the fastening effect of the bolt and the nut become ineffective. The spring washer is used to avoid such ineffectiveness of the fastening effect of the bolt and the nut. However, even the use of spring washer is unable to prevent perfectly the bolt and the nut from loosening due to the action of heat and vibrations on the bolt and the nut. Meanwhile, the adhesive locking method filters an adhesive into gaps between the openings of the bolt and the nut to lock together the bolt and the nut fastening members to be fastened together from loosening. If the adhesive is heated to a high temperature not lower than 100° C., the adhesive may possibly melt and the locking effect of the adhesive may become ineffective. The adhesive may possibly be softened if the adhesive is heated at a temperature exceeding 50° C. and the bolt and the nut may possibly be made to become loose by vibrations.

As indicated in FIGS. 20A and 20B, When a bolt 21 and a nut 22 are used under a severe condition in which the bolt and the nut suffer both heat and vibrations, a through hole 23 is formed through the nut 22 and the bolt 21 after fastening members to be fastened together with the bolt 21 and the nut 22, and a spring pin 24 or a split cotter pin 25 is inserted in the hole 23 formed through the nut 22 and the bolt 21 to locking the nut to the bolt.

When the members to be fastened together are made of soft material, such as aluminum or a plastic material, touching portions of the members in contact with the nut and the head of the bolt may cause plastic deformation due to compressive force exerted thereon by the bolt and the nut and vibrations, so that gaps can be formed therebetween. Therefore, periodical inspection is necessary. Upon such inspection, the split pin or the spring pin must be removed and the nut or the bolt must be refastened. Then another through hole must be formed through the nut and the bolt and the split pin or the spring pin must be inserted in the new through hole for locking.

If the through hole is formed every time the deformation of the members is inspected, many through holes are formed through the bolt, so that the strength of the bolt decreases necessarily. The strength of the bolt consequently decreases to a level not high enough to exert a sufficient compressive force to the members. Therefore, the bolt must sometimes be replaced with a new one.

Since, the work for locking the nut to the bolt, in most cases, is carried out after completing the fabrication of the members to be fastened together, chips produced when the through hole is formed through the nut and the bolt, are occasionally scattered in the peripheral equipment. In some cases, such chips cause a electrical trouble in the peripheral equipment. In some cases, it is difficult to form a through hole or insert the split pin or the spring pin in new through hole because of a position of the nut and the bolt.

SUMMARY OF THE INVENTION

It is an object of the present invention to provide a bolt and a nut locking mechanism capable of readily fastening members to be fastened together with at least one of a bolt and a nut and of preventing at least one of the bolt and the nut from becoming loose.

To achieve the above mentioned object, the present invention provides the following bolt or nut locking mechanism.

A bolt locking mechanism according to the present invention, in which a bolt is locked by using a taper piece and a plate member, such as a washer, comprises the bolt for fastening at least two members together, which has a head and a shaft and one of the head and shaft is provided with a first part in the side, the plate member for putting between the bolt and one of the members, which has a second part on one face to be contacted with the bolt and a third part on another face and a first hole for passing the bolt through, and the taper piece for embedding in the one of the members, which has a portion provided with a fourth part on a face to be contacted with the another face of the washer and a second hole for passing the bolt through. When the bolt fastens the members trough the washer and the taper piece, the first part and second part engage with each other and the third part and the forth part engage with each other for preventing the bolt from loosening, respectively. Accordingly, the bolt locking mechanism prevents the bolt from rotating in an loosening direction relative to the member.

A locking mechanism according to the present invention, in which one of a bolt and a nut is locked by using a taper piece, comprises a bolt and a nut for fastening at least two members together, one of which has a first part, a taper piece for embedding in one of the members, which has a portion provided with a second part on a face to contact with one of the bolt and the nut and a hole for passing the bolt through. The first part and the second part engage with each other for preventing one of the bolt and the nut from loosening when the bolt and the nut fasten the members through the taper piece. Accordingly, the locking mechanism prevents one of the bolt and the nut from rotating in an loosening direction.

A nut locking mechanism according to the present invention, in which a nut is locked by using a taper piece and a plate member, such as a washer, comprises a bolt and the nut, which is provided with a first part in the side, for fastening at least two members together between the bolt and the nut, the plate member for putting between the nut and one of the members, which has a second part on one face to contact with the nut and a third part on another face and a first hole for passing the bolt through and the taper piece for embedding in the one of the members, which has a portion provided with a fourth part on a face to contact with the another face of the washer and a second hole for passing the bolt through. When the bolt and the nut fasten the members through the washer and the taper piece, the first part and second part engage with each other and the third part and the forth part engage with each other for preventing the nut from loosening, respectively. Accordingly, the nut locking mechanism prevents the nut from rotating in an loosening direction relative to the member.

BRIEF DESCRIPTION OF THE DRAWINGS

FIGS. 5A and 5C are sectional views of a bolt locking mechanism using a taper piece having the flange portion provided with projections on outer edge and a bolt having the head provided with openings in the side.

FIGS. 6A to 6F are views of a bolt locking mechanism using an locking washer provided with projections at outer edge and a bolt having the head provided with openings in the side.

FIGS. 7A to 7K are views of a bolt locking mechanism using a taper piece having the flange portion provided with openings, a locking washer provided with projections on inner and outer edges and a bolt having the shaft provided with openings in the shaft.

FIGS. 8A and 8D are views of a combination of inner projections of the locking washer and openings of the shaft.

FIGS. 9A to 9E are views of assistance in explaining the shape of openings formed in the neck of the shaft.

FIGS. 11A and 11C are views of a bolt locking mechanism using an locking washer provided with projections on inner and outer edges and a bolt having the shaft provided with openings in the shaft.

FIGS. 14A and 14E are views of a bolt locking mechanism using a locking washer provided with projections on outer edge and a bolt having the head provided with openings.

FIGS. 16A and 16C are views of a nut locking mechanism using a taper piece having the flange portion provided with openings, a locking washer provided with projections on outer edge and a nut provided with openings in the face.

FIG. 17A to 17B is a view of a nut locking mechanism using a locking washer provided with projections on outer edge and a nut provided with openings in the face.

FIGS. 19A to 19G are views of a bolt locking mechanism for fastening together thin members.

FIGS. 20A and 20D are views of conventional bolt locking mechanism.

DESCRIPTION OF THE PREFERRED EMBODIMENTS

Preferred embodiments of the present invention will be described below.

First Embodiment

Figure 1A:
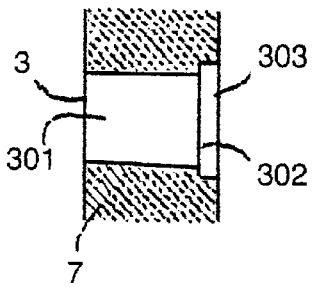
FIGS. 1A to 1K are views showing components of a bolt locking mechanism according to the present invention, and a tool for forming the components.
Figure 1B:
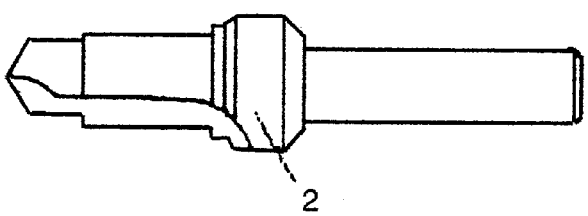

A bolt locking mechanism in a first embodiment according to the present invention comprises a taper piece 1, a plate member 4 and a bolt 5. As shown in FIG. 1J, the bolt 5 has a head provided with a first part which comprises openings 511. As shown in FIG. 1E, the plate member 4 is provided with a second part which includes outer projections 411 and a third part which includes insertion projections 401 on an outer edge. As shown in FIG. 1D, a taper piece 1 has a extended portion provided with a fourth part which comprises openings 105. As mentioned below, the first part and the second part can engage with each other and the third part and the fourth part can engage with each other.

Figure 2:
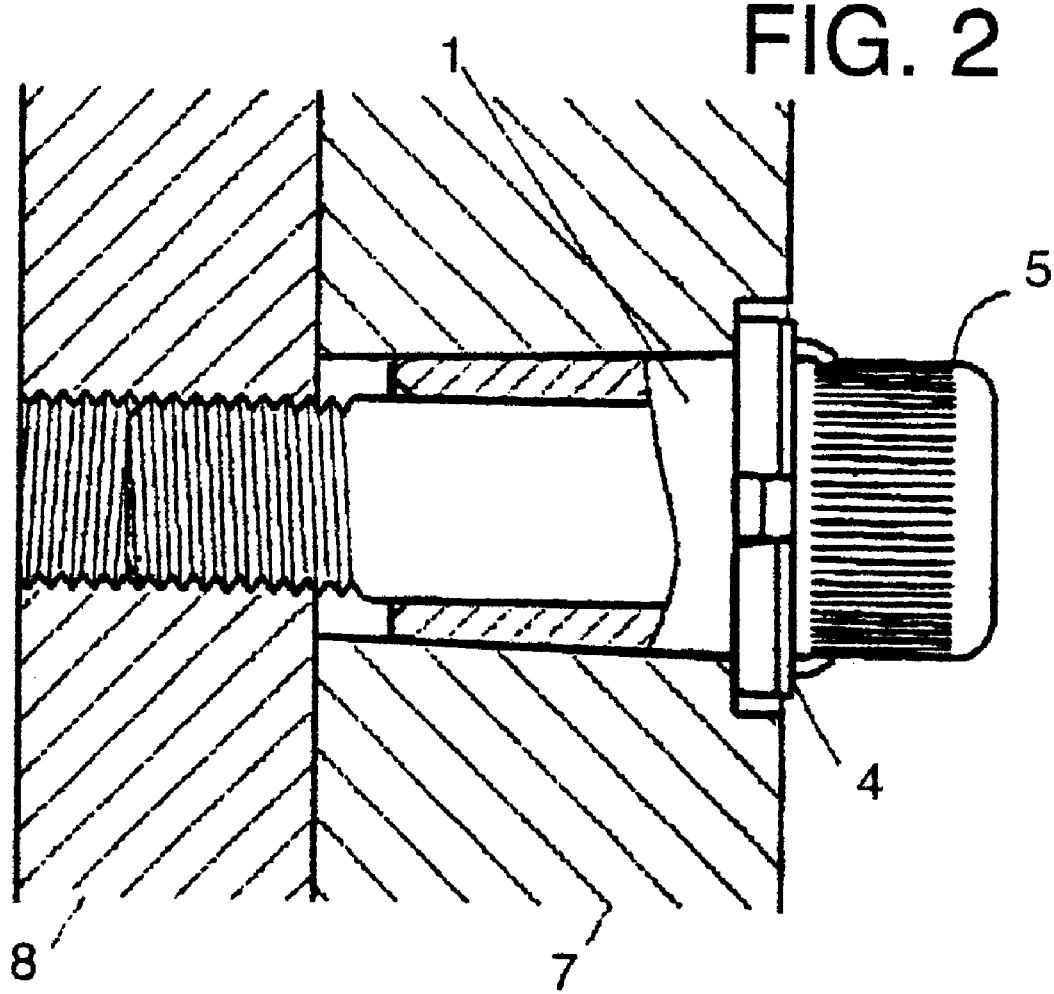
FIG. 2 is a sectional view of a bolt locking mechanism according to the present invention.

The taper piece 1 is driven into a taper piece receiving hole 3 formed in a member to be fastened. FIG. 2 shows a first member 7 and a second member 8 to be fastened together by the bolt 5, the plate member 4 and the taper piece 1. A plurality of members more than two members may be fastened together. When a plurality of members are fastened together, the member provided with the taper piece receiving hole 3 into which the taper piece 1 is driven is the first member 7 and the members farther from the first member 7 are designated by greater numbers. Assuming when the first member 7 and the second member 8 are fastened together, the first member 7 is provided with the taper piece receiving hole 3 into which the taper piece 1 is driven.

Although there is no restriction on the material for making the taper piece 1, it is preferable to make the taper piece 1 of a material of a hardness equal to or higher than that of a material making the member to be fastened. For example, if the member to be fastened is made of aluminum or a plastic material, the taper piece 1 should be made of a material having the same hardness or harder than that, such as stainless steel. If the taper piece 1 is made of a material softer than that making the member to be fastened, the taper piece 1 suffers the application of stress. Besides, the taper piece 1 may cause plastic deformation resulting from the application of stress thereto by the member when the taper piece 1 is driven into the taper piece receiving hole 3 of the member because the volume of the taper piece 1 is smaller than that of the member. And consequently, the taper piece 1 cannot be held in place by the elastic force of the member. The elastic force of the member is generated when the taper piece 1 is forced into the taper piece receiving hole 3 of the member to deform the member elastically. If the member to be fastened is made of extremely soft material like wood, it is effective to make the taper piece 1 of a plastic material.

The taper piece 1 may be made of a material exhibiting hardness substantially equal to that of the material making the member to be fastened. When the member to be fastened is made of a general structural steel or a stainless steel, the taper piece 1 may be made of the same structural steel or stainless steel. The taper piece 1 may be made of a material exhibiting a hardness greater than that of the material making the member to be fastened; the taper piece 1 may be made of a hardened carbon steel in a high rigidity. When the taper piece 1 is used in combination with a member made of an aluminum alloy or copper, the taper piece 1 may be made of a steel, such as a soft steel, a carbon steel, a light alloy steel and a heat-refining steel (quenched and tempered steel of grade about HRC15 to HRC25) or a nonferrous metal, such as phosphor bronze or brass.

The taper piece and the taper piece receiving hole 3 for receiving the taper piece 1 have shapes as shown in FIGS. 1C–1F. The taper piece 1 has a taper portion 101, and a extended portion 102 provided with two projection receiving openings 105 for locking the bolt 5. The taper piece 1 could have at least one projection receiving opening 105. A through hole 104 is formed through the taper piece 1. The taper portion 101 has an outer side surface of a shape resembling a frustum. The extended portion 102 is formed at the large end of the taper portion 101. The extended portion 102 is, more specifically, a flange portion 102 and has an annular shape and extends in a plane nearly perpendicular to the axis of the taper portion 101. The through hole 104 is formed parallel to the axis of the taper portion 101 and nearly coaxial with the taper portion 101. The projection receiving openings 105 are formed at two substantially symmetrical positions with respect to the center axis of the taper portion 101 for preventing the bolt from getting loose, in the flange portion 102. The projection receiving openings 105 could have a nearly U-shaped cross section opening viewed from the right angle along the taper piece 1 with respect to a central axis of the taper portion 101.

The taper piece receiving hole 3 is formed in the member to be fastened to receive the taper piece 101 therein. The taper piece receiving hole 3 has a flange portion receiving section 303 and a taper portion receiving section 301. The flange portion receiving section 303 is formed in a cylindrical shape in a surface of the first member 7 to receive the flange portion 102 of the taper piece 1. The taper portion receiving section 301 opens expanding toward the flange portion receiving section 303 and is connected to the bottom of the flange portion receiving section 303. The taper portion 101 of the taper piece 1 is fitted in the taper portion receiving section 301. The flange portion 102 of the taper piece 1 rests on a shoulder 302 formed at the joint of the taper portion receiving section 301 and the flange portion receiving section 303 so that the flange portion 102 is prevented from slipping into the taper portion receiving section 301.

Figure 1C:
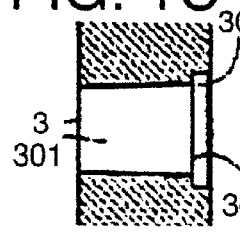
Figure 1D:
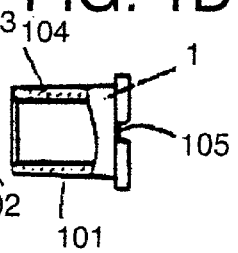
Figure 1E:
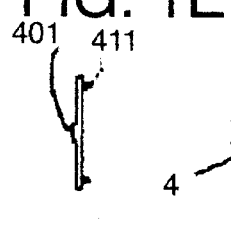
Figure 1F:
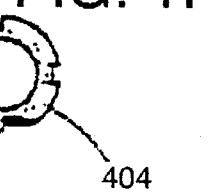
Figure 1G:
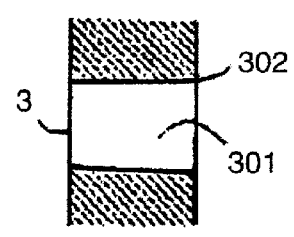

The first member 7 may be provided, instead of the taper piece receiving hole 3 shown in FIG. 1C, a taper piece receiving hole 3 having only a taper portion receiving section 301 without any section corresponding to the flange portion receiving section 303 as shown in FIG. 1G. When the first member 7 is provided with the taper piece receiving hole 3 as shown in FIG. 1G, the outer surface of the first member 7 serves as the shoulder 302.

The taper portion 101 is formed in such a size as that the taper portion 101 may be fitted in the taper portion receiving section 301 with a light interference fit. When the taper piece 1 is dropped simply into the taper piece receiving hole 3, the flange portion 102 is separated and positioned above the shoulder 302. The taper piece 1 is driven into the taper piece receiving hole 3 to let the flange portion 102 seat on the shoulder 302, thus the taper piece 1 is held in place by friction. The friction is dependent on a rate of the taper of the taper portion 101 and produced by compressive force exerted by the first member 7 on the taper piece 1. The friction acts in an axial direction to which the taper piece 1 is inserted in the taper piece receiving hole 3.

When the taper piece 1 is driven into the taper piece receiving hole 3, the first member 7 is deformed elastically because the taper piece 1 is fitted in the taper piece receiving hole 3 in an interference fit. Thus, the taper piece 1 is held in place by compressive force exerted thereon by the elastically deformed first member 7. The rate of the taper of the taper piece 1 must not be excessively large to cause the plastic deformation of the first member 7. If a large force that will cause the plastic deformation is applied locally to the first member 7, the elastic compressive force of the first member 7 is unavailable. The flange portion 102 of the taper piece 1 limits the depth of insertion of the taper piece 1 in the taper piece receiving hole 3 in order to prevent the plastic deformation of the first member 7.

Fastening experiments were conducted. A bolt of a nominal size of M8 was used as the bolt 5, and the taper piece 1 was formed of a stainless steel. The first member 7 of an aluminum alloy and the second member 8 of a structural steel of grade SS41 were fastened together. The rate of the tapers of the taper piece receiving hole 3 of the first member 7 and the taper piece 1 were $1/20$. A dimension of the interference fit was varied in the range of 0.04 to 0.1 mm. The taper piece 1 could easily be driven into and could firmly be held in the taper piece receiving hole 3 when the dimension for the interference fit was in the foregoing range. The taper rate represents the degree of relative divergence of two straight lines with length in a projection or a longitudinal section of the taper portion 101 of the taper piece 1.

The taper rate is a key value on which the fastening strength of the bolt and the nut is based in the present invention. The friction must be large enough to enable the taper piece 1 to be driven easily into the taper piece receiving hole 3 and to be held in the taper piece receiving hole 3 with reliability. In view of easiness in driving the taper piece 1 into the taper piece receiving hole 3 and firmness in holding the taper piece 1 in the taper piece receiving hole 3 of the elasticity of the first member 7, a taper rate of $1/20$ is quite adequate when the taper piece 1 and the first member 7 are made of hard materials. A generally appropriate taper rate is in the range of $1/50$ to $1/10$. When the first member 7 is made of a soft material, such as wood, an adequate taper rate is in the range of $1/7$ to $1/5$ to use the elasticity of the first member 7 because wood is easy to cause plastic deformation and allows limited elasticity.

Difficulty in driving the taper piece 1 into the taper piece receiving hole 3 increases with the increase of the taper rate of the taper portion 101 of the taper piece 1. A taper piece having a taper portion of a greater taper rate needs greater force for driving the taper piece into the corresponding taper piece receiving hole.

If the driving of the taper piece 1 into the taper piece receiving hole 3 is difficult, the taper piece 1 may perfectly be pushed into the taper piece receiving hole 3 by the fastening force of the bolt 5 instead of forcibly driving the taper piece 1 into the taper piece receiving hole 3 because the taper piece 1 cannot be turned about the center axis relative to the first member 7 unless the flange portion 102 is separated from the shoulder 302 of the first member 7. Accordingly, if the fastening force of the bolt 5 is increased moderately, the taper piece 1 is never turned. The moderate increase of the fastening force signifies increase of the fastening force of the bolt 5 to a level that will not affect members of soft materials.

The dimension for the interference fit between the taper portion 101 and the taper portion receiving section 301 must accurately be controlled to hold the taper piece 1 in the taper piece receiving hole 3 by friction. It is important to form the taper portion 101 accurately and to form the taper portion receiving section 301 and the flange portion receiving part 303 simultaneously by machining to control the dimension for the interference fit accurately. When the taper portion receiving section 301 and the flange portion receiving section 303 are machined individually, the accuracy is deteriorated if the dimensions of either the taper portion receiving section 301 or the flange portion receiving section 303 are different even slightly from correct dimensions.

Figure 3A:
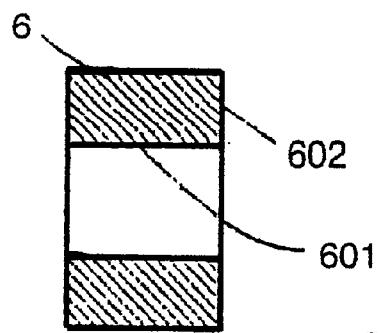
FIGS. 3A to 3D are views of a tool test gage, a tool and a taper piece.
Figure 3B:
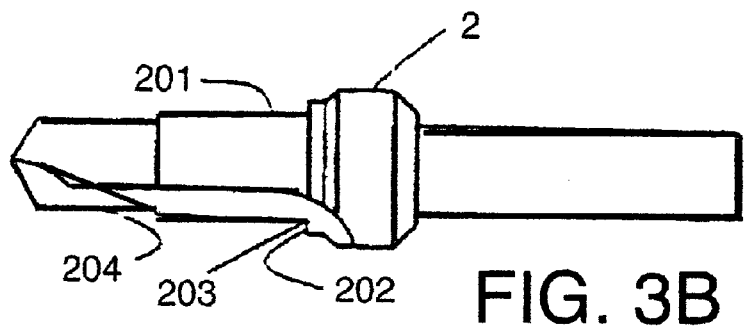
Figure 3C:
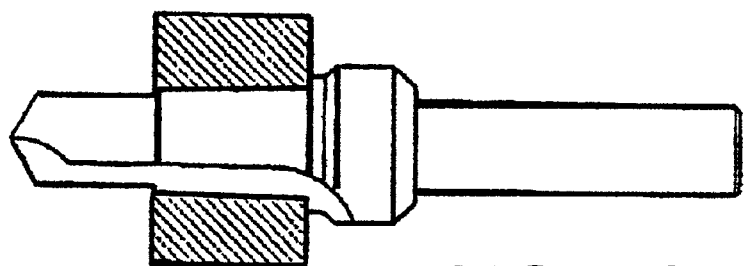
Figure 3D:
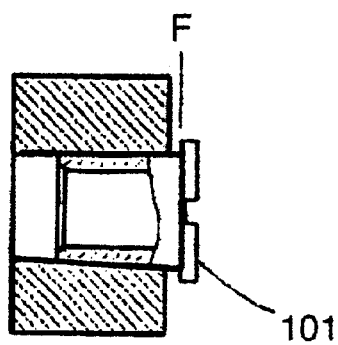

A boring tool 2 as shown in FIG. 1B and FIG. 3B is used for forming the taper piece receiving hole 3. The boring tool 2 is provided integrally with both first cutting edges 201 for forming the taper portion receiving section 301 and second cutting edges 202 for forming the flange portion receiving section 303 by spot facing.

A gage 6 shown in FIG. 3A is used for measuring the accuracy of the boring tool 2 for simultaneously forming the taper portion receiving section 301 and the flange portion receiving section 303. The gage 6 has a taper bore 601 for testing the accuracy of the first cutting edges 201, and an end surface 602 for testing the accuracy of the second cutting edges 202. The first member 7 is machined with the second cutting edges 202 to form the flange portion receiving section 303. The accuracy of the second cutting edges 202 is adjusted by processing the second cutting edges 202 of the boring tool 2. The accuracy of the diameter of the shoulder 302 changes according to the accuracy of the second cutting edges 202. A corner 203 at the joint of the large end of the first cutting edges 201 and the second cutting edges 202 must be rounded to form the taper piece receiving hole 3 so that the taper piece 1 is fitted perfectly in the taper piece receiving hole 3. The radius of the round corner is in the range of about 0.2 to about 0.5, although it is up to the size of the bolt.

The corner 203 is rounded to avoid forming burrs at the edge of the shoulder 302 corresponding to the corner 203 of the boring tool 2 and to secure a relief around the joint of the taper portion 101 and the flange portion 102 so that the flange portion 102 is able to be in close contact with the shoulder 302.

When the taper portion 101 of the taper piece 1 is driven into the taper portion receiving section 301 of the taper piece receiving hole 3 of the first member 7 in the interference fit, forces are exerted on the taper portion 101 and the side surface of the taper portion receiving section 301 according to the principle of action and reaction. If the corner 203 is not rounded, burrs are formed in the shoulder 302 due to the concentration of force on the shoulder 302 in contact with the joint of the taper portion 101 and the flange portion 102 of the taper piece 1. Therefore the corner 203 is rounded to form a relief to prevent the formation of burrs. The respective radii of the rounded corner 203 and the joint of the taper portion 101 and the flange portion 102 of the taper piece 1 must be determined so that the taper piece 1 can properly be fitted in the taper piece receiving hole 3. The radius of the corner 203 must not excessively small because an excessively small relief is formed and the taper piece 1 cannot properly be fitted in the taper piece receiving hole 3 if the radius of the corner 203 is excessively small. The radius of the corner 203 should not excessively great. It is desirable to form the taper piece 1 capable of receiving the bolt 5 therethrough in the least necessary size. The excessively large taper piece 1 is absurd because it is disadvantageous to reducing materials and constructing an apparatus in a small size to spare a large area for the bolt 5. Therefore it is preferable to form the taper piece 1 in the least necessary size. Similarly, it is preferable to form the flange portion 102 as small as possible. However, the flange portion 102 must have an area that prevents the flange portion 102 from sinking into the first member 7.

As shown in FIG. 3B, a drill 204 is formed in a tip portion of the boring tool 2. The drill 204 drills the taper piece receiving hole 3.

The boring tool 2 is a forming tool. The taper piece receiving hole 3 can accurately be formed with ease using the boring tool 2, even if it is mounted to a drilling machine for processing. It goes without saying that the taper piece receiving hole 3 can more accurately be formed by use of a rigid machining center.

Figure 1H:
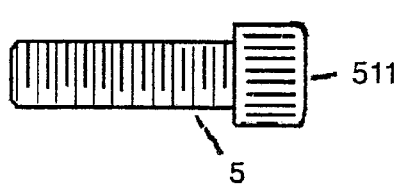
Figure 1I:
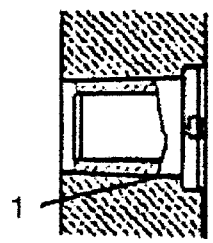
Figure 1J:
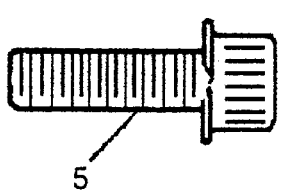
Figure 1K:

As shown in FIG. 1H, the bolt 5 has the head provided with the openings 511 in the side. In this embodiment, openings 511 could be axial openings and more specifically parallel, axial openings. The openings 511 could comprise at least one opening. Each opening 511 could be more specifically groove or cut.

The plate member 4 shown in FIG. 1F is used to lock the bolt 5. The plate member 4 is, more specifically, a locking washer 4 and has a annular part 404 which is approximately flat. The annular part 4 is provided with outer projections 411 and insertion projections 401. The insertion projections 401 are arranged symmetrically with respect to the central axis of the annular part 404. The insertion projections 401 could be formed by bending two substantially opposite portions of the outer edge of the annular part 404 in a first direction. The locking washer 4 could have at least one insertion projection 401 The insertion projections 401 are inserted into the projection receiving openings 105 formed in the flange portion 102 of taper piece 1. The outer projections 411 are arranged symmetrically with respect to the central axis of the annular part 404. The outer projections 411 could be formed by bending two substantially opposite portions of the outer edge of the annular part 404 in a second direction approximately opposite to the first direction. The locking washer 4 could have at least one outer projection 411. The outer projections 411 engage with the openings 511 formed in the side of the head of the bolt 5. The insertion projections 401 and the outer projections 411 could be in any shape which can engage with the openings 511 and 105 and more specifically tooth, hooks, pin, and so on.

The taper piece 1 is driven into and held in the taper piece receiving hole 3 of the first member 7. The locking washer 4 is placed on the flange portion 102 of the taper piece 1 with the insertion projections 401 inserted in the projection receiving openings 105 of the flange portion 102. Consequently, the locking washer 4 is unable to rotate relative to the taper piece 1.

As shown in FIG. 2, the bolt 5 is passed through the locking washer 4 and the through hole 104 of the taper piece 1 fitted in the taper piece receiving hole 3 of the first member 7, and is screwed in an hole provided with thread on an internal face formed in the second member 8. In this state, the outer projections 411 of the locking washer 4 engage with the openings 511 formed in the head of the bolt 5. Thus, the bolt locking mechanism for restraining the bolt 5 from turning in an loosening direction is constructed. The first member 7 and the second member 8 can be fastened together by ordinary bolting work which passes the bolt 5 through the locking washer 4 and applies torque to the bolt 5 with a turning tool to screw the bolt 5 in the hole of the second member 8.

In this bolt locking mechanism, once the first member 7 and the second member 8 are fastened together with the bolt 5, the bolt 5 is unable to turn in the unfastening direction unless the taper piece 1 turns in the taper piece receiving hole 3 or the locking washer 4 breaks.

The taper piece 1 must become loose in the taper piece receiving hole 3 to turn in the taper piece receiving hole 3. However, since the taper portion 101 of the taper piece 1 is driven into the taper portion receiving section 301 of the taper piece receiving hole 3 in an interference fit, and the taper piece 1 is biased into the taper piece receiving hole 3 by the fastening force of the bolt 5 and is firmly held in place by a large friction, it is hardly possible for the taper piece 1 to turn in the taper piece receiving hole 3. Therefore, the bolt 5 never becomes loose unless the outer projections 411 of the locking washer 4 is broken.

When it is necessary to remove the bolt for maintenance or the like, torque is applied to the bolt 5 to rotate the bolt 5 forcibly in the loosening direction taking the material, thickness and/or the shape of projections of the outer projections 411 into account, whereby the outer projections 411 are broken or disengaged from the openings 511 of the head of the bolt 5.

No adverse effect is produced on the second member 8 provided with the hole by the forcible unfastening of the bolt 5 because the torque applied to the bolt 5 to unfasten the bolt 5 acts only as a force that breaks the outer projections 411 of the locking washer 4.

The outer projections 411 of the locking washer 4 could easily be disengaged from the openings 511 of the bolt 5 and the bolt 5 could easily be detachable when the openings 511 of the bolt 5 would be made shallow or the openings 511 would be formed in a proper shape. Even if the openings 511 would be shallow or the openings 511 would be formed in a proper shape, the bolt 5 would not become loose unless the bolt 5 is rotated forcibly in the loosening direction.

Figure 4:
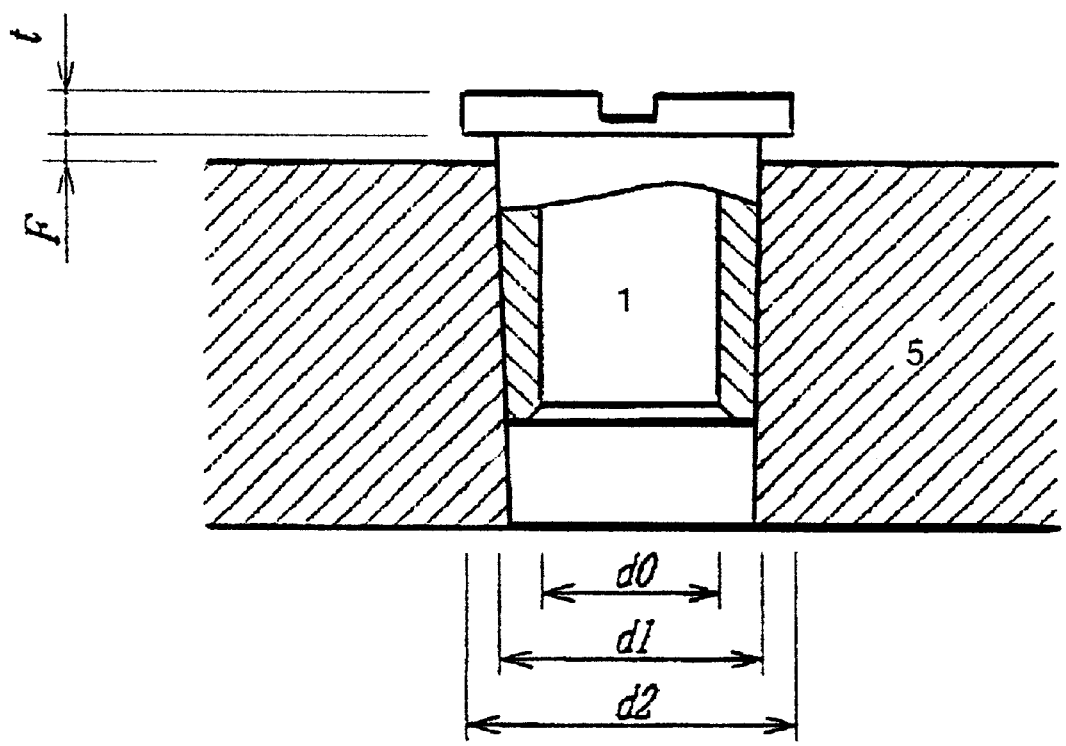
FIG. 4 is a sectional view of a taper piece having the flange portion provided with openings.

The present invention is not limited in its practical application to the bolt locking mechanism including the bolt of the nominal size of M8 and is applicable to a bolt locking mechanism including a bolt of any nominal size. According to FIG. 4, suitable dimensions of the taper piece 1 are expressed by the following expressions.

$$d1=(1.1 \text{ to } 2.0) \times d0$$

More preferably, $$d1=(1.2 \text{ to } 1.5) \times d0$$

$$d2=d0+(0.5 \text{ to } 3.0)$$

$$t=0.5 \text{ to } 3 \text{ mm}$$

$$T=1/30 \text{ to } 1/10$$

$$F=(0.1 \text{ to } 1\%) \times d1$$

where d0 is the diameter of the bolt, d1 (mm) is the diameter of the large end of the taper portion 101, d2 (mm) is the outside diameter of the flange portion 102, t (mm) is the thickness of the flange portion 102, T is the taper rate of the taper portion 101 and F (mm) is the dimension for the interference fit between the taper portion 101 of the taper piece 1 and the taper piece receiving hole 3.

Values expressed above are for a taper piece 1 to be used in combination of the first member 7 formed of a soft metal, such as an aluminum alloy or copper. When the taper piece 1 is used in combination with the first member 7 formed of a softer material like nonmetallic material, such as wood or a plastic material, a desirable taper rate is in the range of 1/30 to 1/5 and a desirable diameter of the flange portion 102 is in the range of 1 to 4 mm to prevent the flange portion 102 from sinking into the first member 7.

A bolt locking method of fastening the first member 7 and the second member 8 together with a bolt comprises the steps of fitting the taper piece 1 in the taper piece receiving hole 3 formed in the first member 7, placing the locking washer 4 on the flange portion 102 of the taper piece 1 with the insertion projections 401 inserted with the projection receiving openings 105 of the taper piece 1, inserting the bolt 5 through the locking washer 4 in the through hole 104 of the taper piece 1, screwing the bolt 5 in the hole provided with the thread on inner face formed in the second member 8, and bringing the outer projections 411 of the locking washer 4 into engagement with the openings 511 of the bolt 5.

This embodiment is applicable to a bolt fix mechanism for fixing the bolt 5 to the first member 7. As to fixing the bolt 5 to the first member 7, an thread is formed on face of the through hole 104 of the taper piece 1. The taper piece 1 may be provided with a bottomed hole instead of the through hole 104. A bolt fix method using the bolt fix mechanism comprises the steps of fitting the taper piece 1 in the taper piece receiving hole 3 formed in the first member 7, placing the locking washer 4 on the flange portion 102 of the taper piece 1 with the insertion projections 401 engaged with the projection receiving openings 105 of the taper piece 1, inserting the bolt 5 through the locking washer 4, screwing the bolt 5 in the through hole 104 provided with thread formed in the taper piece 1, and bringing the outer projections 411 of the locking washer 4 into engagement with the openings 511 of the bolt 5.

The bolt locking mechanism according to this embodiment, which fastens together members by using the taper piece driven into the member, the locking washer and the bolt, has a prominent locking effect as compared with the conventional screwing mechanism using the conventional bolt and the conventional locking washer.

Since the taper piece is firmly fitted in the taper piece receiving hole when the taper piece is pressed through the locking washer by the bolt, the members to be fastened together are further firmly held and highly reliable screwing can be achieved.

Second Embodiment

A bolt locking mechanism in a second embodiment according to the present invention comprises an taper piece 11 having a flange portion provided with a second part which includes outer projections 111 shown in FIG. 5A and the same bolt 5 having a head provided with a first part which comprises the opening 511 with the bolt 5 included in the bolt locking mechanism in the first embodiment. The second embodiment differs from the first embodiment in that the second embodiment includes the taper piece 11 having a flange portion 112 instead of the flange portion 102, and does not include any member corresponding to the locking washer 4.

The flange portion 112 is provided with outer projections 111. The flange portion 112 could have at least one outer projection 111. In second embodiment, the outer projections 111 could be formed at two positions symmetrical with respect to the center axis of the flange portion 112 by bending two peripheral portions of the flange portion 112 in a direction away from the taper portion 101. The outer projections 111 could be in any shape which can engage with the openings 511 and more specifically tooth, hooks, pin, and so on.

The member 7, 8 to be fastened together are the same with the members in the first embodiment.

The taper piece 11 is driven into and held in the taper piece receiving hole 3 of the first member 7. The bolt 5 is passed through the through hole 114 of the taper piece 11 fitted in the taper piece receiving hole 3 of the first member 7, and is screwed in the hole provided with thread on the face formed in the second member 8. In this state, the outer projections 111 engage with the openings formed in the head of the bolt 5 as shown in FIG. 5C. Thus, the bolt locking mechanism for restraining the bolt 5 from turning in an loosening direction is constructed.

Third Embodiment

As shown in FIGS. 6B and 6C, a bolt locking mechanism in a third embodiment according to the present invention comprises the same locking washer 4 and the same bolt 5 with the locking washer 4 and the bolt 5 included in the bolt locking mechanism in the first embodiment, respectively. In other words, The locking washer 4 is provided with a second part which includes outer projections 411 and a third part which includes insertion projections 401 on an outer edge and the bolt 5 has the head provided with a first part which comprises openings 511. The bolt locking mechanism in the third embodiment differs from the first embodiment in that the first member 7 formed bolt holes 408 instead of the taper piece receiving hole 3 as shown in FIG. 6A and a fourth part, which comprises two projection receiving openings 409 in the surface as shown in FIG. 6A, is fastened. And the bolt locking mechanism in the third embodiment does not need any component corresponding to the taper piece 1. The second member 8 is the same with that in the first embodiment.

The bolt hole 408 is formed through the first member 7. The two projection receiving openings 409 are formed at positions symmetrical with respect to the center axis of the bolt hole 408 in the surface of the first member 7 so as to open into the bolt hole 408. At least one projection opening 409 could be formed in the surface of the first member 7. Each of the openings 409 may be formed by machining the first member 7 with an end mill by advancing the end mill in a radial direction from the bolt hole 408. The openings 409 may be formed when forming the first member 7. Each opening 409 could be more specifically hole, recess or groove formed in the surface.

The locking washer 4 is placed on the first member 7 with the insertion projections 401 inserted in the openings 409 of the first member 7 so that the locking washer 4 is unable to turn relative to the first member 7. The bolt 5 is passed through the locking washer 4 and the bolt hole 408 of the first member 7 and is screwed in the hole provided with thread on the face formed in the second member 8. The outer projections 411 of the locking washer 4 engage with the openings 511 formed in the head of the bolt 5 as shown in FIG. 6F. Thus, the bolt locking mechanism for restraining the bolt 5 from turning in an loosening direction is constructed.

Fourth Embodiment

As shown in FIG. 7C, a bolt locking mechanism in a fourth embodiment according to the present invention comprises the same taper piece 1 having a flange portion provided with a fourth part which comprises openings 105 with the taper piece 1 included in the first embodiment, an locking washer 41 provided with a second part which includes inner projections 412 and a third part which includes insertion projections 401, and a bolt 51 having a shaft provided with a first part which comprises openings 501 in a shaft. The fourth embodiment differs from the first embodiment in that the fourth embodiment uses the locking washer 41 provided with inner projections 412 instead of the locking washer 4, and the bolt 51 having the shaft provided with openings 501 instead of the bolt 5. The member 7, 8 to be fastened together are the same with the members in the first embodiment.

As shown in FIG. 7D, the locking washer 41 has insertion projections 401, inner projections 412, projection openings 413, and a annular part 404. In this embodiment, the inner projections 412 are formed at three positions arranged at equal angular intervals on the inner edge of the annular part 404. The inner projections 412 are substantially flat, rectangular projections projecting from the inner edge of the annular part 404 in a fastening direction in which the bolt 51 is turned for fastening. To locking the bolt 51, each inner projection 412 is formed so that portions of the inner projection 412 farther from a base portion of the inner projection 412 joined to the annular part 404 and nearer to a point of the inner projection 412 are farther from the inner edge of the annular part 404. As shown in FIGS. 8B and 10, each projection opening 413 is a space formed between the inner projection 412 and the annular part 404 and can receive each inner projection 412. When the bolt 51 is loosened forcibly, the inner projections 412 are forced to bend elastically into the projection openings 413 so that the inner projections 412 may not be broken. Each inner projection 412 could be arranged at the inner edge in other way and in other shapes. Each projection opening 403, as viewed along an axial direction, could be a semicircular space or a space of a shape substantially resembling a triangle having one circular side.

As shown in FIG. 7F, the bolt 51 is provided with the openings 501 in the neck of the shaft. The bolt 51 could be provided with at least one opening 51. Each opening 501 could be axial opening and more specifically V-shaped axial opening. Further, each opening 501 could be more specifically groove or cut.

As shown in FIGS. 7H and 7K, the taper piece 1 is driven into and held in the taper piece receiving hole 3 of the first member 7. The locking washer 41 is placed on the flange portion 102 of the taper piece 1 with the insertion projections 401 inserted in the projection receiving openings 105 of the flange portion 102. Consequently, the locking washer 4 is unable to rotate relative to the taper piece 1, the bolt 51 is passed through the locking washer 41 and the through hole 104 of the taper piece 1 fitted in the taper piece receiving hole 3 formed in the first member 7 and is screwed in the hole provided with thread on the face formed in the second member 8. In this state, the inner projections 412 of the locking washer 41 engage with the openings 501 formed in the shaft of the bolt 51. Thus, a ratchet mechanism for restraining the bolt 51 from rotating in an loosening direction about the center axis of the taper piece 1 is constructed.

The shape of the opening 501, particularly V-shaped axial opening 501 was examined to study the dependence of the strength of engagement of the inner projections 402 and the V-shaped axial opening 501 and the number of the V-shaped axial openings 501 on the depth, the angle between the opposite sides of the V-shaped axial opening 501 and the displacement of the bolt 51 from the center axis of the locking washer 41.

As shown in FIG. 8C, the angle between the opposite sides of the V-shaped axial opening 501 was 90°. The bolt 51 was passed trough the locking washer 41 with the center axis of the bolt 51 substantially aligned with that of the locking washer 41, and the two inner projections 412 of the locking washer 41 engaged with the V-shaped axial openings 501. When the bolt 51 was turned forcibly in the loosening direction, the inner projections 412 were warped away and slid and then disengaged from the V-shaped axial openings 501. And neither the inner projections 412 of the locking washer 41 nor the V-shaped axial openings 501 of the bolt 51 were damaged.

However, the inside diameter of the locking washer 41 was slightly greater than the diameter of the shaft of the bolt 51 and hence a small gap was formed between the locking washer 41 and the bolt 51. Therefore, the bolt 51 was liable to be displaced from the center axis of the locking washer 41 if the locking washer 41 was provided with two inner projections 412. Although the strength of engagement between the inner projections 412 and the openings 501 could be enhanced by increasing the depth of the V-shaped axial openings 501, the number of the V-shaped axial openings 501 decreased necessarily and the tendency for the bolt 51 to be displaced from the center axis of the locking washer 41 was enhanced. On the other hand, the bolt 51 could be placed with the center axis of the bolt 51 nearly aligned with that of the locking washer 41 if the locking washer 41 was provided with at least three inner projections 412. The misalignment of the respective center axes of the locking washer 41 and the bolt 51 could be prevented by the arrangement of the inner projections 412 of the locking washer 41 to be engaged with the V-shaped axial openings 501 of the bolt 51 at equal angular intervals of 120° about the center axis of the bolt 51.

Accordingly, the locking washer 41 employed in the fourth embodiment is provided with the three inner projections 412 to keep the center axis of the locking washer 41 nearly aligned with that of the bolt 51.

According to this embodiment, the locking washer 41 and the bolt 51 can be aligned and hence highly reliable screwing can be achieved.

The strength of engagement of the V-shaped axial openings 501 and the inner projections 412 were measured for various depths of the V-shaped axial openings 501. When the depth of the V-shaped axial openings 501 was decreased to a value at which the number of the V-shaped axial openings 501 was sixty, the strength of engagement between the V-shaped axial openings 501 and the inner projections 412 was sufficient, and the bolt 51 could be turned in the fastening direction and could not be turned in the loosening direction and the ratchet mechanism functioned properly.

The shape of the V-shaped axial openings 501 was examined to make the V-shaped axial openings 501 capable of meeting various conditions. As shown in FIGS. 9B, 9D and 9E, various shapes of the V-shaped axial openings 501, which were formed so that a bisector bisecting the angle between the opposite sides of each V-shaped axial opening deviates from a line passing the center axis of the bolt 51 and bisecting the bolt 51, were considered with an intention to make each inner projection 402 exert a force on the bolt 51 in a direction toward the bottom of the V-shaped axial opening 501 and to construct a more effective ratchet mechanism in which one of the opposite sides of the V-shaped axial opening 501 allows the inner projection 402 to slide thereon easily and the other side of the V-shaped axial opening 501 enables the inner projection 402 to engage therewith easily. Further, in the examination, the angle of the corner of the tip of the inner projection 402 of the locking washer 41 that engages with the V-shaped axial opening 501 was about 90°. The effect of the ratchet mechanism appeared when the deviation angle between the bisector and the line was increased to an angle in the range of about 5° to 6° as shown in FIG. 9B. Furthermore, the effect of the ratchet mechanism became conspicuous when the deviation angle was about 30° or greater. When the deviation angle was in the range of about 30° to 40° as shown in FIG. 9D, the inner projection 402 was deformed if the bolt 51 was turned in the loosening direction. When the deviation angle was about 45° as shown in FIG. 9F, the strength of engagement was as high as to cause joining two metals each of which is a material for the inner projection 402 and the bolt 51.

Therefore, it is preferable that the deviation angle is about 30° or greater to ensure the reliable engagement of the inner projection 402 and the V-shaped axial opening 501.

According to this embodiment, since one of the opposite sides of the V-shaped opening 501 is formed to allow the inner projection 402 to slide thereon easily, and the V-shaped openings 501 are formed so that a bisector bisecting the angle between the opposite sides of the V-shaped opening 501 deviates from a line passing the center axis of the bolt and bisecting the bolt 51 at a deviation angle in the range of about 30° to over, the inner projection 402 and the V-shaped opening 501 are engaged effectively to provide a prominent locking effect.

Figure 10A:
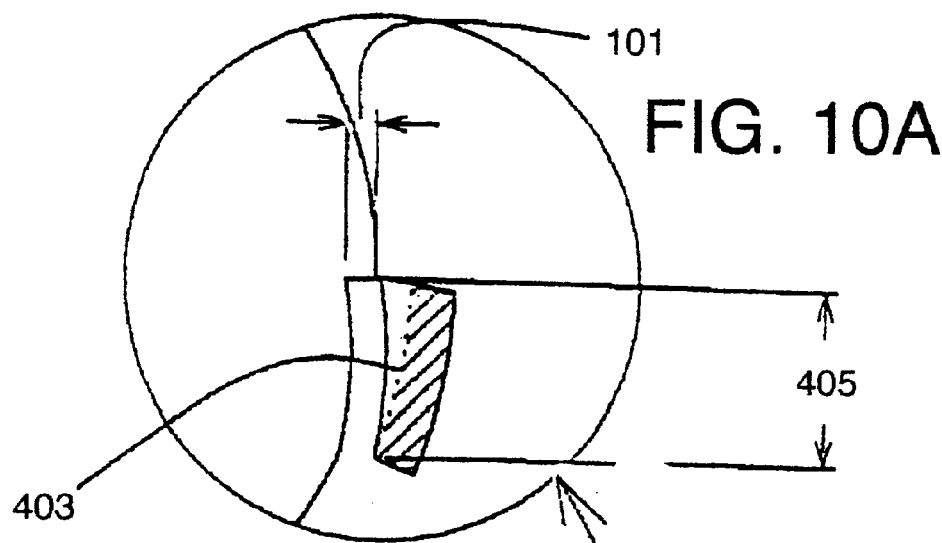
FIGS. 10A to 10C is a view of assistance in explaining an locking washer provided with projections on inner edge.
Figure 10B:
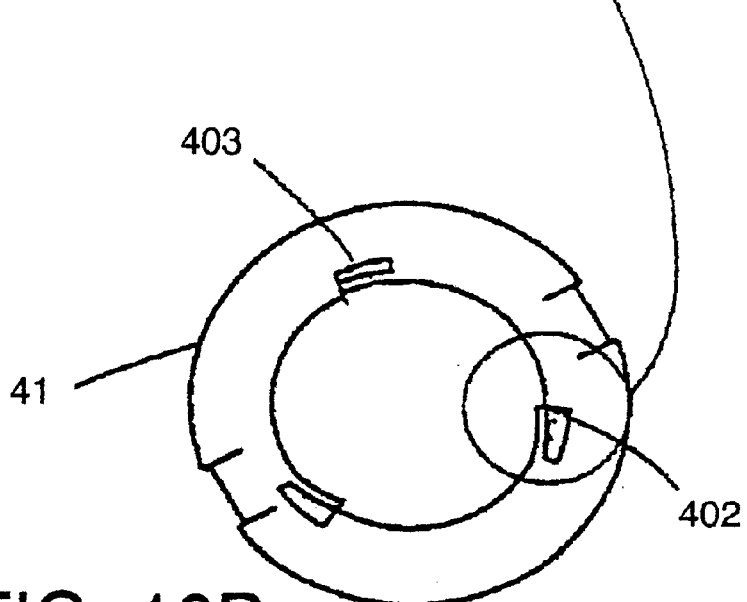
Figure 10C:
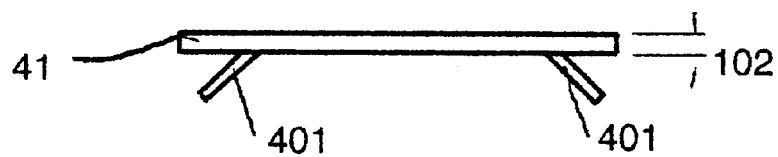

FIGS. 10A–10C shows a general view of the locking washer 41 by way of example. The locking washer 41 which was used in the examination is specified by the following parameters. Material: Quenched and tempered steel, Thickness (t): 0.2 mm, Outside diameter: 14 mm, Inside diameter: 8.6 mm, Number of inner projections: Three (Arrangement at equal angular intervals of about 120°), Number of the insertion projections 401: Two (Arrangement at equal angular intervals of about 180°), Measurement of projection from the inner edge about inner projections (P): 0.5 mm, Diameter of the shaft of the bolt: 8.5 mm.

When the projection openings 403 of the locking washer 41 are formed in a sufficiently large size, the inner projections 402 deform by the force exerted thereon and drop into the projection openings 403 if the bolt 51 is rotated in the loosening direction. Consequently, the inner projections 402 are disengaged from the openings 501 of the bolt 51. If the width 404 and the length 405 of the inner projections 402 are determined properly, the inner projections 402 can be disengaged from the openings 501 without damaging the inner projections 402 even if the locking washer 41 is not made of a quenched and tempered steel.

The ratchet mechanism can easily be constructed for bolts of nominal sizes greater than that of a nominal size of M6. In that case, the number of the openings 501 may be increased according to the diameter of the bolt. The formation of the openings 501 may be difficult and a depth of the openings 501 may be formed more shallow, when the bolt 5 is of a nominal size equal to or smaller than a nominal size of M5. Therefore an adjustment of the engagement of the internal projections 402 and the openings 501 may be necessary. However such problems can be solved by forming the locking washer 41 in a thickness of about 0.15 mm or below.

Fifth Embodiment

A bolt locking mechanism in a fifth embodiment according to the present invention fastens the first member 7 and the second member 8 together by using the same locking washer 41 and the same bolt 51 with the locking washer 41 and the bolt 51 used in the bolt locking mechanism in the fourth embodiment, respectively. That is, the locking washer 41 is provided with a second part which includes inner projections 412 and a third part which includes insertion projections 401, and the bolt 51 has the shaft provided with a first part which comprises the openings 501 in the shaft as shown in FIG. 11A. The first member 7 is formed bolt holes 408 and a fourth part which comprises two projection receiving openings 409 in the surface as same as the first member 7 in the third embodiment. The bolt locking mechanism in the fifth embodiment does not need any component corresponding to the taper piece 1. The second member 8 is the same with that in the third embodiment.

The bolt locking mechanism in the fifth embodiment differs from the third embodiment in that the bolt locking mechanism in the fifth embodiment has the locking washer 41 instead of the locking washer 4, and the bolt 51 shown in FIG. 11B instead of the bolt 5.

The locking washer 41 is placed on the first member 7 with the insertion projections 401 inserted in the openings 409 of the first member 7 so that the locking washer 4 is unable to turn relative to the first member 7. The bolt 51 is passed through the locking washer 4 and the bolt hole 408 of the first member 7 and is screwed in the hole provided with thread on the face formed in the second member 8. The inner projections 412 of the locking washer 41 engage with the openings 501 formed in the shaft of the bolt 5. Thus, the bolt locking mechanism for restraining the bolt 5 from turning in an loosening direction is constructed.

The manner and the effect of engagement between the locking washer 41 and the first member 7 is the same as that between those of the third embodiment. And the manner and the effect of engagement between the locking washer 41 and the bolt 51 is the same as that between those of the fourth embodiment.

Sixth Embodiment

Figure 12A:
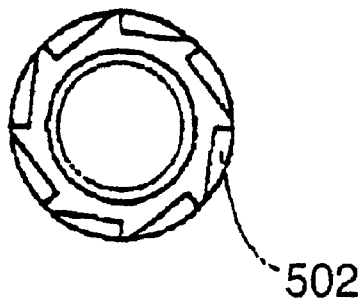
FIGS. 12A and 12C are views of a bolt locking mechanism using a taper piece having the flange portion provided with openings, a locking washer provided with projections on outer edge and a bolt having the head provided with openings.

A bolt locking mechanism in a sixth embodiment according to the present invention comprises the same taper piece 1 with the taper piece 1 included in the first embodiment and the same locking washer 4 with the locking washer 4 used in the first embodiment, and a bolt 53 having a head provided with a first part which comprises openings 502 as shown in FIG. 12A. That is, the taper piece 1 has a flange portion provided with a fourth part which comprises openings 105 and the locking washer 4 is provided with a second part which includes outer projections 411 and a third part which includes insertion projections 401 on an outer edge. The member 7, 8 to be fastened together are the same with the members in the first embodiment.

Figure 12B:
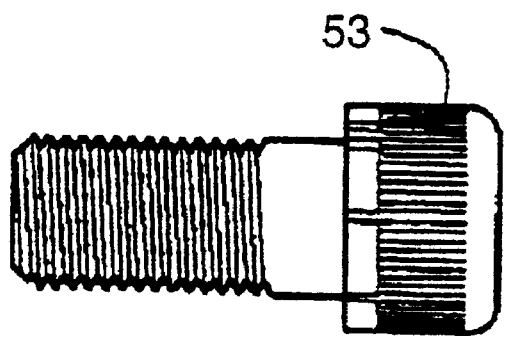
Figure 12C:
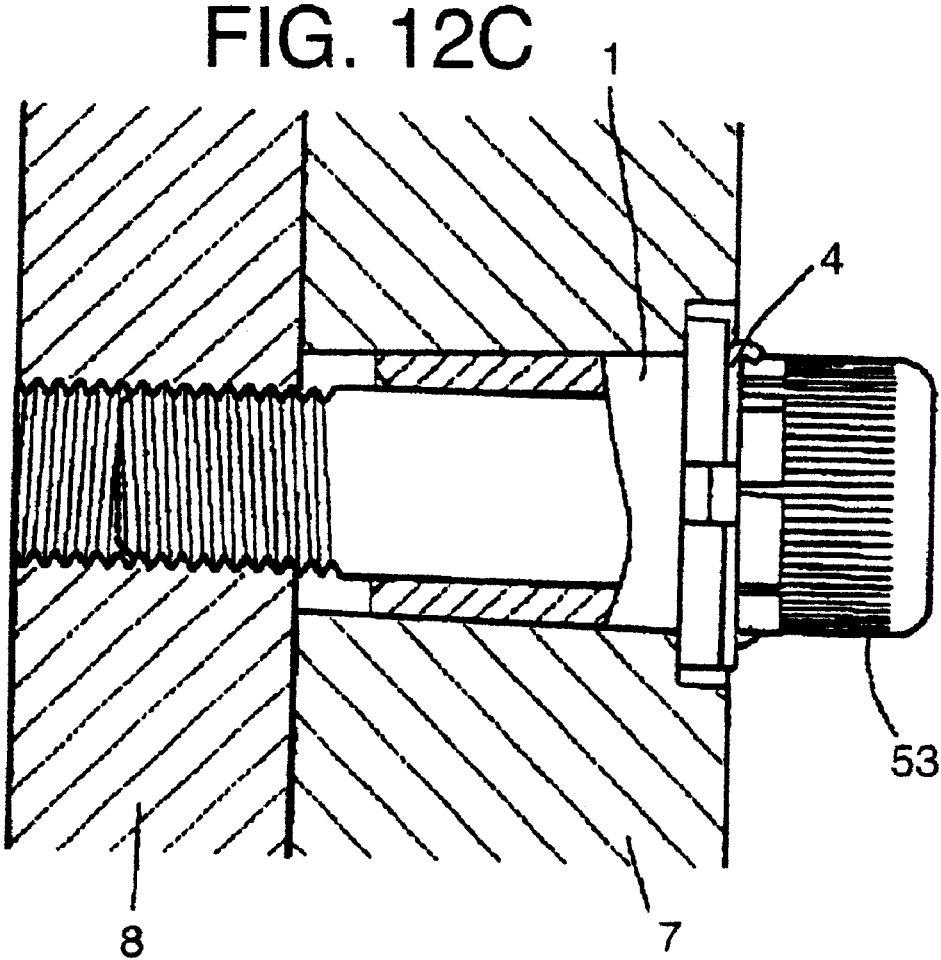

The bolt locking mechanism in the sixth embodiment differs from the first embodiment in that the bolt locking mechanism in the sixth embodiment employs the bolt 53 shown in FIG. 12B instead of the bolt 5.

The bolt 53 has a head provided with openings 502 which engage with the outer projections 411 of the locking washer 4. The openings 502 could comprise at least one opening. Each opening 502 could be axial opening and more specifically V-shaped axial opening and have a V-shaped cross section. The openings 502 are formed in a lower half section of the side of the head of the bolt 53. The shape of each opening 502 could be the same with that of the openings 501 of the bolt 51 employed in the fourth embodiment. Each opening 502 could be more specifically groove or cut.

The taper piece 1 is driven into and held in the taper piece receiving hole 3 of the first member 7. The locking washer 4 is placed on the flange portion 102 of the taper piece 1 with the insertion projections 401 inserted in the projection receiving openings 105 of the flange portion 102, the bolt 53 is passed through the locking washer 4 and the through hole 104 of the taper piece 1 fitted in the taper piece receiving hole 3 of the first member 7, and is screwed in the hole provided with thread on the face formed in the second member 8. In this state, the outer projections 411 of the locking washer 4 engage with the openings 502 formed in the head of the bolt 53. Thus, the bolt locking mechanism for restraining the bolt 53 from turning in an loosening direction is constructed.

Since the openings 502 are easy to form, the bolt locking mechanism in the sixth embodiment is suitable for fastening the members together with a bolt of nominal size of M5 or below. Since the circumference of the head of the is greater than that of the shaft of the bolt 53, the number of the openings 502 formed in the head of the bolt 53 is greater than that of the openings formed in the shaft. It is also effective to employ a nut, which will be described later in connection with tenth, eleventh, twelfth, thirteenth and fourteenth embodiments.

Seventh Embodiment

Figure 13:
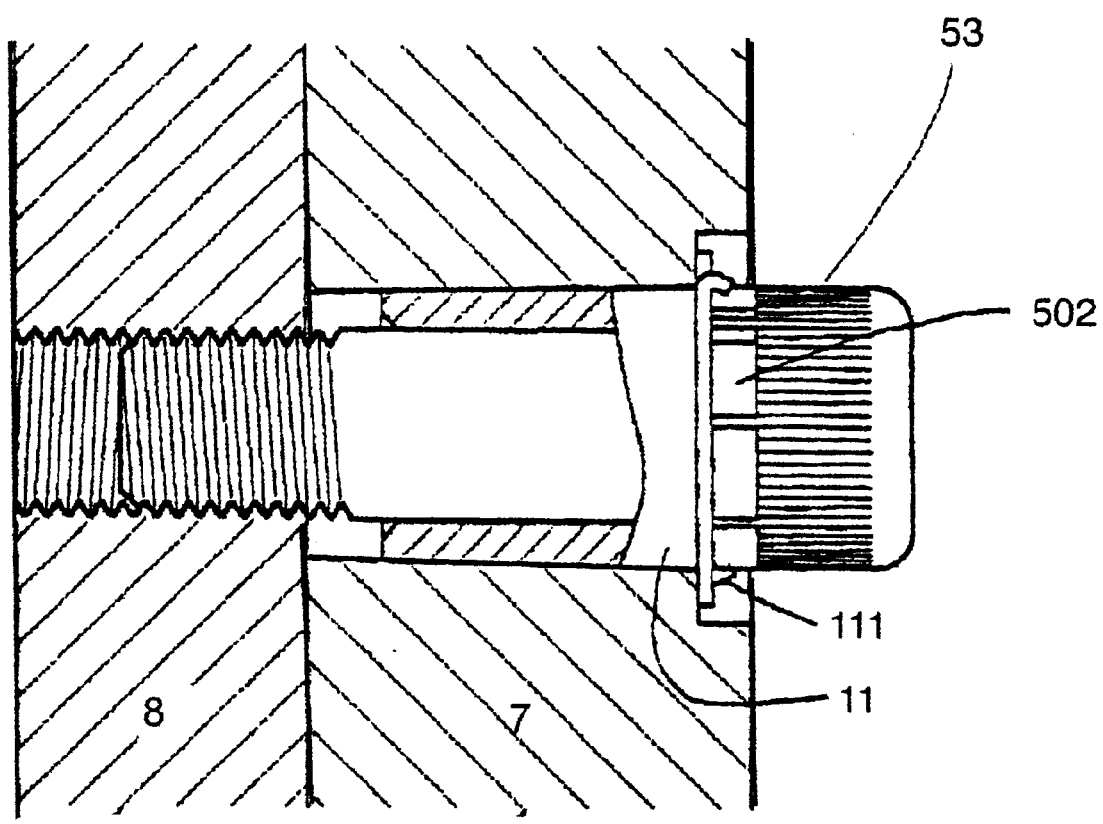
FIG. 13 is a view of a bolt locking mechanism using a taper piece having the flange portion provided with projections on outer edge and a bolt having the head provided with openings.

As shown in FIG. 13, a bolt locking mechanism in a seventh embodiment according to the present invention comprises the same taper piece 11 with the taper piece 11 used in the second embodiment and the same bolt 53 with the bolt 53 employed in the sixth embodiment. That is, the taper piece 11 has a flange portion provided with a second part which includes outer projections 111 and the bolt 53 has a head provided with a first part which comprises openings 502. The member 7, 8 to be fastened together are the same with the members in the first embodiment.

The seventh embodiment differs from the second embodiment in that the bolt locking mechanism in the seventh embodiment employs the bolt 53 instead of the bolt 5.

The taper piece 11 is driven into and held in the taper piece receiving hole 3 of the first member 7. The bolt 53 is passed through the through hole 114 of the taper piece 11 fitted in the taper piece receiving hole 3 of the first member 7, and is screwed in the hole provided with thread on the face formed in the second member 8. In this state, the outer projections 111 engage with the openings 502 formed in the head of the bolt 53. Thus, the bolt locking mechanism for restraining the bolt 53 from turning in an loosening direction is constructed.

The manner and effect of engaging the taper piece 11 and the bolt 53 is similar to that employed in the second embodiment.

Eighth Embodiment

As shown in FIGS. 14A–14E, a bolt locking mechanism in an eighth embodiment according to the present invention comprises the same locking washer 4 with the locking washer 4 used in the third embodiment and the same bolt 53 with the bolt 53 employed in the sixth embodiment. That is, the locking washer 4 is provided with a second part which includes outer projections 411 and a third part which includes insertion projections 401 on an outer edge and the bolt 53 has a head provided with a first part which comprises openings 502. The first member 7 is formed bolt holes 408 and a fourth part which comprises projection receiving openings 409 in the surface as same as the first member 7 in the third embodiment.

The eighth embodiment differs from the third embodiment in that the bolt locking mechanism in the eighth embodiment uses the bolt 53 instead of the bolt 5.

The locking washer 4 is placed on the first member 7 with the insertion projections 401 inserted in the openings 409 of the first member 7 so that the locking washer 4 is unable to turn relative to the first member 7. The bolt 53 is passed through the locking washer 4 and the bolt hole 408 of the first member 7 and is screwed in the hole provided with thread on the face formed in the second member 8. The outer projections 411 of the locking washer 4 engage with the openings 502 formed in the head of the bolt 53. Thus, the bolt locking mechanism for restraining the bolt 53 from turning in an loosening direction is constructed.

The manner of engaging the outer projections 411 of the locking washer 4 and the openings 502 of the bolt 53 is similar to that employed in the sixth embodiment.

Ninth Embodiment

As shown in FIGS. 15A–15E, a bolt locking mechanism in a ninth embodiment according to the present invention comprises the same locking washer 4 with the locking washer used in first embodiment, a taper piece 14 and a bolt 54. The bolt 54 has a head provided with a first part comprises openings 512. The locking washer 4 is provided with a second part which includes outer projections 411 and a third part which includes insertion projections 401 on an outer edge. The taper piece 14 has a flange portion provided with a fourth part which comprises openings 106. The member 7, 8 to be fastened together are the same with the members in the first embodiment.

Figure 15A:
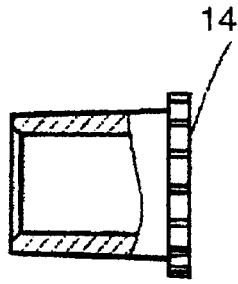
FIGS. 15A to 15E are views of a bolt locking mechanism using a taper piece having the flange portion provided with openings in the side and a locking washer provided with projections on outer edge and a bolt having the head provided with openings in the side.
Figure 15B:
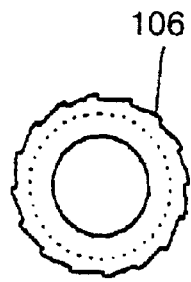
Figure 15C:
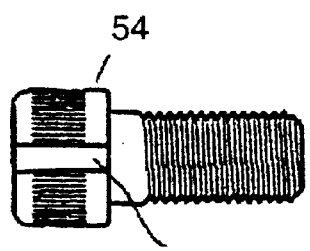
Figure 15D:
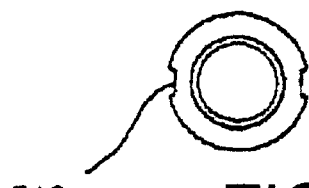
Figure 15E:
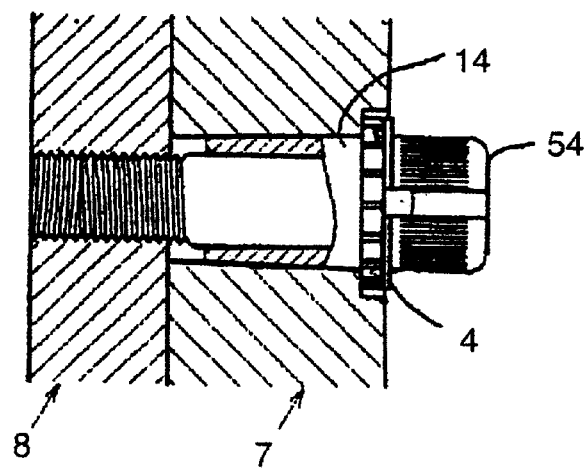

The ninth embodiment differs from the first embodiment in that the bolt locking mechanism in the ninth embodiment employs the taper piece 14 shown in FIG. 15A instead of the taper piece 1 and the bolt 54 shown in FIG. 15C instead of the bolt 5.

The taper piece 14 has a flange portion provided with openings 106, while the flange portion 102 of the taper piece 1 is provided with the projection receiving openings 105. The flange portion could have at least one opening 106. The openings 106 are formed in the side of the flange portion. Each opening 106 could be more specifically V-shaped axial opening and formed as a groove or cut.

The openings 512 are formed in the side of the head of the bolt 54 in which the insertion projections 401 of the locking washer 4 can be inserted. The bolt 54 could have at least one opening 512. Each openings 512 could be formed in parallel to the center axis of the head, and positioned in the side of the head symmetrically with respect to the center axis of the head. Each openings 512 could have a substantially U-shaped cross section.

The taper piece 14 is driven into and held in the taper piece receiving hole 3 of the first member 7. The bolt 54 is passed through the locking washer 41 and the through hole 104 of the taper piece 1 fitted in the taper piece receiving hole 3 formed in the first member 7 and is screwed in the hole provided with thread on the face formed in the second member 8. In this state, the insertion projections 401 of the locking washer 4 are inserted in the openings 512 of the head of the bolt 54. Consequently, the locking washer 4 is unable to rotate relative to the bolt 54. Further, in this state, the outer projections 411 of the locking washer 41 engage with t he openings 106 form ed in the flange portion of the taper piece 14. Thus, a bolt locking mechanism for restraining the bolt 54 and the locking washer 4 from rotating in an loosening direction is constructed.

In the ninth embodiment, since the diameter of the flange portion is nearly equal or greater than that of the head, the number of openings formed in the flange portion can be nearly equal or greater than that formed in the head.

Tenth Embodiment

As shown in FIGS. 16A–16C, a nut locking mechanism in an tenth embodiment according to the present invention comprises a taper piece 1, a locking washer 4 and a nut 61. The nut 61 is provided with a first part which comprises openings 601 as shown in FIG. 16A. The locking washer 4 is provided with a second part which includes outer projections 411 and a third part which includes insertion projections 401 on an outer edge. The taper piece 1 has a flange portion provided with a fourth part which comprises openings 105. The taper piece 1 and the locking washer 4 are the same as the taper piece 1 and the locking washer 4 included in the first embodiment. The first member 7 to be fastened is the same with the member in the first embodiment. The second member 8 to be fasten is provided with a bolt hole formed through itself.

The tenth embodiment differs from the first embodiment in that the nut locking mechanism in the eleventh embodiment employs an ordinary bolt instead of the bolt 5, and the nut 61 shown in FIG. 16A which screws on the bolt from the side of the first member 7 to fasten the first member 7 and the second member 8 together.

The nut 61 is provided with openings 601 which engage with the outer projections 411 of the locking washer 4. The nut 61 could be provided with at least one opening. Each opening 601 could be axial opening and more specifically V-shaped axial opening and have a V-shaped cross section. The openings 601 are formed in a lower half section of the side of the nut 61. The shape of each opening 601 could be the same with that of the openings 502 of the bolt 53 employed in the sixth embodiment. Each opening 601 could be more specifically groove or cut.

The taper piece 1 is driven into and held in the taper piece receiving hole 3 of the first member 7. The bolt is inserted through a bolt hole formed in the second member 8 and the through hole 104 of the taper piece 1 to project a point formed thread of a shaft of the bolt from the first member 7. The locking washer 4 is placed on the flange portion 102 of the taper piece 1 with the insertion projections 401 inserted in the projection receiving openings 105 of the flange portion 102. The shaft of the bolt is passed through the locking washer 4 and projects from the locking washer 4. The nut 61 is screwed on the shaft of the bolt to fasten together the first member 7 and the second member 8. In this state, since the insertion projections 401 inserted in the projection receiving openings 105 of the flange portion 102, the locking washer 4 is unable to rotate relative to the taper piece 1. Further, the outer projections 411 of the locking washer 4 engage with the openings 601 formed in the nut 61. Thus, the nut locking mechanism for restraining the nut 61 from turning in an loosening direction is constructed.

The nut locking mechanism according to this embodiment has a prominent locking effect as compared with the conventional screwing mechanism using the conventional bolt, the conventional locking washer and the conventional nut.

Since the taper piece is firmly fitted in the taper piece receiving hole when the taper piece is pressed through the locking washer by the nut, the members to be fastened together are further firmly held and highly reliable screwing can be achieved.

Eleventh Embodiment

A nut locking mechanism in a Eleventh embodiment according to the present invention comprises a taper piece 11 and a nut 61. The nut 61 is provided with a first part which comprises openings 601 and the same as the nut 61 included in the tenth embodiment. The taper piece 11 has a flange portion provided with a second part which includes outer projections 111 and is the same as the taper piece 11 used in the second embodiment. The member 7, 8 to be fastened together are the same with the members in the tenth embodiment.

The eleventh embodiment differs from the tenth embodiment in that the nut locking mechanism in the eleventh embodiment employs the taper piece 11 instead of the taper piece 1 and does not have any component corresponding to the locking washer 4.

The taper piece 11 is driven into and held in the taper piece receiving hole 3 of the first member 7. The bolt is inserted through a bolt hole formed in the second member 8 and the through hole 104 of the taper piece 1 to project a point formed thread of a shaft of the bolt from the first member 7. The nut 61 is screwed on the shaft of the bolt to fasten together the first member 7 and the second member 8. In this state, the outer projections 111 of the taper piece 11 engage with the openings 601 formed in the nut 61. Thus, the nut locking mechanism for restraining the nut 61 from rotating in an loosening direction is constructed.

The manner and effect of engagement of the outer projections 111 of the taper piece 11 and the openings 601 of the nut 61 is similar to that of engagement of the taper piece 11 and the bolt 53 in the seventh embodiment.

Twelfth Embodiment

As shown in FIGS. 17A–17B, a nut locking mechanism in a twelfth embodiment according to the present invention comprises the locking washer 4 and the nut 61. The nut 61 is provided with a first part which comprises openings 601 and the same as the nut 61 included in the tenth embodiment. The locking washer 4 is provided with a second part which includes outer projections 411 and a third part which includes insertion projections 401 on an outer edge and the same as the locking washer 4 included in the first embodiment. The first member 7 to be fastened is formed bolt holes and a fourth part which comprises projection receiving openings in the surface and the same as the first member 7 in the third embodiment. The second member 8 is the same with that in the tenth embodiment.

The twelfth embodiment differs from the third embodiment in that the nut locking mechanism in the twelfth embodiment employs the nut 61.

The bolt is inserted through a bolt hole formed in the second member 8 and the bolt hole of the taper piece 1 to project a point formed thread of a shaft of the bolt from the first member 7. The locking washer 4 is placed on the first member 7 with the insertion projections 401 inserted in the openings of the first member 7. The shaft of the bolt is passed through the locking washer 4 and projects from the locking washer 4. The nut 61 is screwed on the shaft of the bolt to fasten together the first member 7 and the second member 8. In this state, since the insertion projections 401 inserted in the openings of the first member, the locking washer 4 is unable to rotate relative to the first member. Further, the outer projections 411 of the locking washer 4 engage with the openings 601 formed in the nut 61. Thus, the nut locking mechanism for restraining the nut 61 from turning in an loosening direction is constructed.

The manner and effect of engagement of the outer projections 411 of the locking washer 4 and the openings 601 of the nut 61 is similar to that of engagement of the locking washer 4 and the bolt 53 in the eighth embodiment.

Thirteenth Embodiment

Figure 18A:
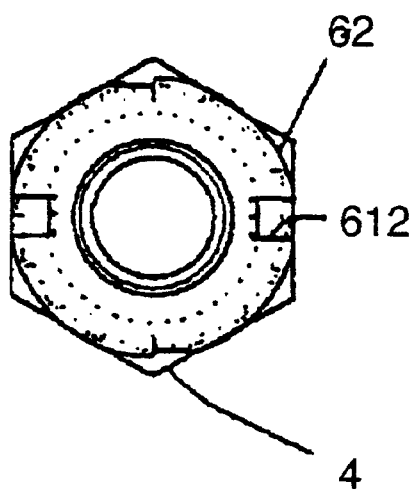
FIGS. 18A and 18C are views of a nut locking mechanism using a taper piece having the flange portion provided with openings in the side, a locking washer provided with projections on outer edge and a nut provided with openings in the side.
Figure 18B:
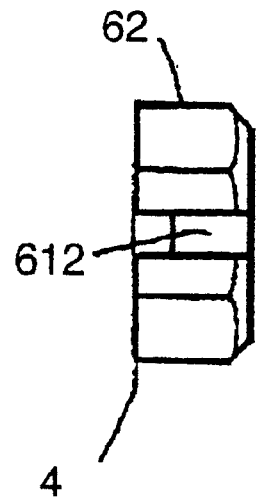
Figure 18C:
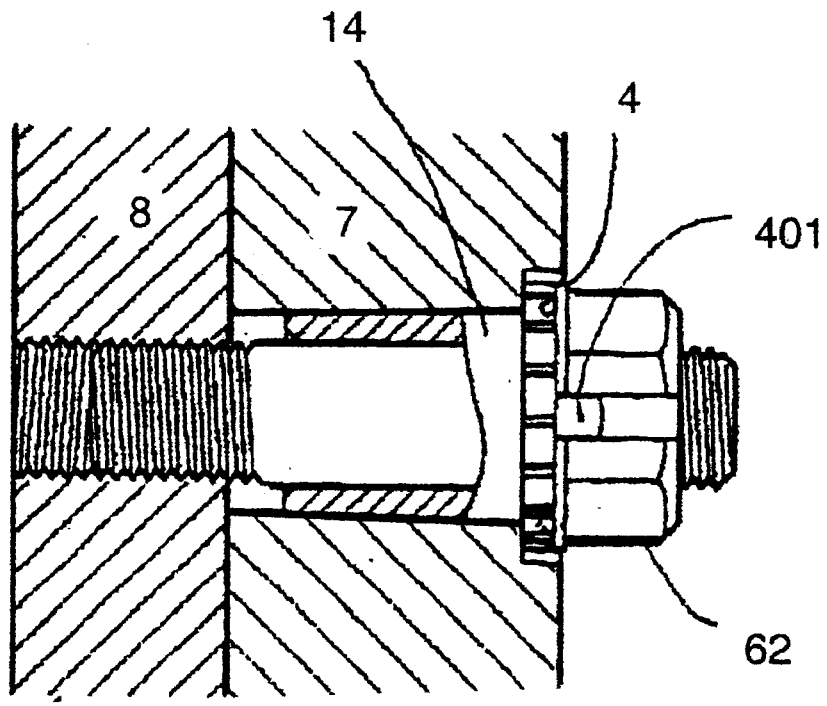

As shown in FIG. 18C, a nut locking mechanism in a thirteenth embodiment according to the present invention comprises the taper piece 14, the locking washer 4 and a nut 62 to fasten together the first member 7 and the second member 8. The nut 62 is provided with a first part which comprises openings 612. The locking washer 4 is provided with a second part which includes outer projections 411 and a third part which includes insertion projections 401 on an outer edge and the same as the locking washer 4 included in the ninth embodiment. The taper piece 14 has a flange portion provided with a fourth part which comprises openings 106 and is the same as the taper piece 14 employed in the ninth embodiment. The member 7, 8 to be fastened together are the same with the members in the tenth embodiment.

The fourteenth embodiment differs from the ninth embodiment in that the nut locking mechanism in the fourteenth embodiment uses the nut 62 shown in FIG. 18A instead of the bolt 54.

The nut 62 is provided with openings 612 in which the insertion projections 401 of the locking washer 4 can be inserted. The openings 612 are formed in the side of the nut 62. The nut 62 could have at least one opening 612. Each openings 612 could be formed in parallel to the center axis of the head, and positioned in the side symmetrically with respect to the center axis of the nut. Each openings 612 could have a substantially U-shaped cross section. Each opening 601 could be more specifically groove or cut.

The taper piece 14 is driven into and held in the taper piece receiving hole 3 of the first member 7. The bolt is inserted through a bolt hole formed in the second member 8 and the through hole 104 of the taper piece 14 to project a point formed thread of a shaft of the bolt from the first member 7. The shaft of the bolt is passed through the locking washer 4 and projects from the locking washer 4. The nut 61 is screwed on the shaft of the bolt to fasten together the first member 7 and the second member 8. In this state, since the insertion projections 401 inserted in the openings 612 of the nut 62, the locking washer 4 is unable to rotate relative to the nut 62. Further, the outer projections 411 of the locking washer 4 engage with the openings 106 formed in the flange portion of the taper piece 14. Thus, the nut locking mechanism for restraining the nut 62 and the locking washer 4 from turning in an loosening direction is constructed.

Fourteenth Embodiment

A screwing mechanism in a fourteenth embodiment according to the present invention is suitable for fastening together the members 7 and 8 when the members 7 and 8 are thin plates. As shown in FIGS. 19A–19G, each of the first member 7 and the second member 8 is provided with a bolt hole 408 and projection receiving openings 409 in the surface. The bolt 53, the locking washer 4 and the nut 61 are used to fasten the members 7 and 8. As shown in FIG. 19G, the bolt 53 has a head provided with a first part which comprises openings 502 and is the same as the bolt 53 in the sixth embodiment. As shown in FIG. 19D, the locking washer 4 is provided with a second part which includes outer projections 411 and a third part which includes insertion projections 401 on an outer edge and the same as the locking washer 4 in the first embodiment. As shown in FIG. 19G, the nut 61 is provided with a first part which comprises openings 601 and the same as the nut 61 in the tenth embodiment.

As shown in FIGS. 19D and 19G, the locking washer 4 is placed on a first surface of the second member 8 with the insertion projections 401 inserted in the projection receiving openings 409 of the second member 8. The bolt 53 is inserted through the locking washer 4 placed on a first surface away from a second surface of the second member 8 in contact with a second surface of the first member 7, the bolt hole 408 of the second member 8, the bolt hole of the first member 7 and another locking washer 4 placed on a first surface of the first member 7 opposite to the second surface in contact with the second surface of the second member 8. The shaft formed thread of the bolt 53 projects from the another locking washer 4. The nut 61 is screwed on the shaft of the bolt 53 from the outer side of the first member 7. In this state, the insertion projections 401 of the locking washer 4 are inserted in the openings 409 of the second member 8 and the outer projections 411 of the locking washer 4 are engaged with the openings 502 of the bolt 53 to locking the bolt 53 relative to the second member 8. Thus, the bolt locking mechanism for restraining the bolt 53 from turning in an loosening direction is constructed. Further, the insertion projections 401 of the another locking washer 4 are inserted in the openings 409 of the first member 7 and the outer projections 411 of the locking washer 4 are engaged with the openings 601 of the nut 61 to locking the nut 61 relative to the first member 7. Thus, the nut locking mechanism for restraining the nut 61 from turning in an loosening direction is constructed.

The bolt holes 408 and the projection receiving openings 409 of the thin plate can easily be formed by press working.

What is claimed is:

1. A bolt locking mechanism, comprising:
   a bolt for fastening at least two members together, said bolt having a head and a shaft and one of said head and shaft is provided with a first part in the side;

a plate member for putting between said bolt and one of the members, said plate member having a second part on one face to be contacted with said bolt and a third part on another face and a first hole for passing said bolt through;

a taper piece for embedding in said one of the members, said taper piece having a portion provided with a fourth part on a face to be contacted with said another face of said plate member and a second hole for passing said bolt through;

wherein, when said bolt fastens the members through said plate member and said taper piece, said first part and second part engage with each other and said third part and said fourth part engage with each other for preventing said bolt from loosening respectively.

2. A bolt locking mechanism according to claim 1, wherein said first part comprises at least one first opening, wherein said second part comprises at least one first projection which projects from said one face and can allow said bolt to rotate in a fastening direction for fastening said bolt and prevent said bolt from rotating in a loosening direction for loosening said bolt by engaging with the opening, wherein said fourth part comprises at least one second opening, and wherein said third part comprises at least one second projection which projects from said another face into said second opening.

3. A bolt locking mechanism according to claim 2, wherein said first opening is a substantially v-shaped opening and formed in the side of one of said head and said shaft, and wherein said first projection is formed around one of an outer edge and an inner edge of said plate member.

4. A bolt locking mechanism according to claim 3, wherein said first projection and second projection are outwardly bent parts of one of an outer edge and inner edge of said plate member, respectively.

5. A bolt locking mechanism according to claim 1, wherein said first part comprises a plurality of openings formed in the side of said head so that each opening is substantially parallel to central axis of said bolt, and wherein said second part comprises two projections formed on two portions of an outer edge arranged substantially symmetrically with respect to a center axis of said plate member and project from said one face for engaging with the openings, respectively.

6. A bolt locking mechanism according to claim 1, wherein said first part comprises a plurality of openings formed in the neck of said shaft so that each opening is substantially parallel to central axis of said shaft, wherein said second part comprises at least three projections formed on three portions arranged at substantially equal angular intervals of an inner edge and project to the fastening direction for fastening said bolt from the inner edge, and wherein said plate member is provided with at least three openings on the inner edge each of which receive said projection when each said projection is deformed.

7. A bolt locking mechanism according to claim 1, wherein said shaft is provided with a thread on a point, wherein said one of the members has a third hole in which said taper piece can be inserted and held and another one of the members has a fourth hole provided with a thread on a face, and wherein said shaft can be inserted into said fourth hole through said first and second holes and screwed for fastening the members together.

8. A locking mechanism, comprising:

a bolt and a nut for fastening at least two members together, one of said bolt and said nut having a first part;

a taper piece for embedding in one of the members, said taper piece having a portion provided with a second part on a face to contact with one of said bolt and said nut and a hole for passing said bolt through; and wherein said first part and said second part engage with each other for preventing one of said bolt and said nut from loosening when said bolt and said nut fasten the members through said taper piece.

9. A locking mechanism according to claim 8, wherein said first part comprises at least one opening, and wherein said second part comprises at least one projection which projects from said face and can allow said bolt to rotate in a fastening direction for fastening said bolt and prevent said bolt from rotating in a loosening direction for loosening said bolt by engaging with the opening.

10. A locking mechanism according to claim 9, wherein said opening is a substantially v-shaped opening and formed in one of the side of said head of said bolt and said nut, and wherein said first projection is formed around an outer edge of said portion.

11. A locking mechanism according to claim 9, wherein said first projection is a bent part of the outer edge of said portion outward from said faces.

12. A locking mechanism according to claim 8, wherein said first part comprises a plurality of openings formed in one of the side of said head and said nut, and wherein said second part comprises two projections formed on two portions of an outer edge of said portion arranged substantially symmetrically with respect to a center axis of said taper piece and project from said face for engaging with the openings.

13. A locking mechanism according to claim 8, wherein said shaft is provided with a thread on a point, wherein said one of the members has a second hole in which said taper piece can be inserted and held and another one of the members has a third hole for passing said bolt through, and wherein said shaft can be inserted into said nut through said first and third holes and screwed to said nut for fastening the members together.

14. A nut locking mechanism, comprising:

a bolt and a nut for fastening at least two members together between said bolt and said nut;

wherein said nut is provided with a first part in the side;

a plate member for putting between said nut and one of the members, said plate member having a second part on one face to contact with said nut and a third part on another face and a first hole for passing said bolt through;

a taper piece for embedding in said one of the members, said taper piece having a portion provided with a fourth part on a face to contact with said another face of said plate member and a second hole for passing said bolt through;

wherein, when said bolt and said nut fasten the members through said plate member and said taper piece, said first part and second part engage with each other and said third part and said forth part engage with each other for preventing said nut from loosening, respectively.

15. A nut locking mechanism according to claim 14, wherein said first part comprises at least one first opening, wherein said second part comprises at least one first projection which projects from said one face and allows said nut to rotate in a fastening direction for fastening said nut and prevent said nut from rotating in a loosening direction for loosening said nut by engaging with the opening, wherein said fourth part comprises at least one second opening, and wherein said third part comprises at least one second projection which projects from said another face to insert into said second opening for preventing rotating.

16. A nut locking mechanism according to claim 15, wherein said first opening is a substantially v-shaped opening and formed in the side of said nut, and wherein said first projection is formed around an outer edge of said plate member.

17. A nut locking mechanism according to claim 15, wherein said first and second projections are made by bending a part of an outer edge of said plate member outward from one of said faces, respectively.

18. A nut locking mechanism according to claim 14, wherein said first part comprises a plurality of openings formed in the side so that each opening is substantially parallel to central axis of said nut, and wherein said second part comprises two projections formed on two portions of an outer edge arranged substantially symmetrically related to a center axis of said plate member and project from said one face for engaging with the openings.

19. A nut locking mechanism according to claim 14, wherein said shaft is provided with a thread on a point, wherein said one of the members has a third hole in which said taper piece is inserted and held and another one of the members has a fourth hole for passing said bolt through, and wherein said shaft inserts into said nut through said first to third holes and screws to said nut for fastening the members together.

* * * * *